United States Patent
Horikoshi et al.

(10) Patent No.: US 11,431,412 B2
(45) Date of Patent: Aug. 30, 2022

(54) WAVELENGTH DISPERSION AMOUNT ESTIMATION APPARATUS

(71) Applicant: NIPPON TELEGRAPH AND TELEPHONE CORPORATION, Tokyo (JP)

(72) Inventors: Kengo Horikoshi, Musashino (JP); Masanori Nakamura, Musashino (JP); Yoshiaki Kisaka, Musashino (JP); Seiji Okamoto, Musashino (JP); Fukutaro Hamaoka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/425,994

(22) PCT Filed: Jan. 15, 2020

(86) PCT No.: PCT/JP2020/001036
§ 371 (c)(1),
(2) Date: Jul. 27, 2021

(87) PCT Pub. No.: WO2020/158386
PCT Pub. Date: Aug. 6, 2020

(65) Prior Publication Data
US 2022/0158731 A1 May 19, 2022

(30) Foreign Application Priority Data
Jan. 30, 2019 (JP) .............................. JP2019-014660

(51) Int. Cl.
*H04B 10/2507* (2013.01)

(52) U.S. Cl.
CPC ............................... *H04B 10/2507* (2013.01)

(58) Field of Classification Search
None
See application file for complete search history.

(56) References Cited

U.S. PATENT DOCUMENTS

| 7,340,187 B2 * | 3/2008 | Takeshita | H04B 10/0795 385/11 |
| 8,909,069 B2 * | 12/2014 | Roberts | H04L 7/0075 398/208 |
| 8,918,444 B2 * | 12/2014 | Hauske | H04B 10/60 708/300 |

(Continued)

FOREIGN PATENT DOCUMENTS

WO   WO-2015141658 A1   9/2015

*Primary Examiner* — Jai M Lee
(74) *Attorney, Agent, or Firm* — Harness, Dickey & Pierce, P.L.C.

(57) ABSTRACT

A wavelength dispersion amount estimation apparatus includes a correlation signal generation unit configured to generate, from a receive signal, a first signal including a main signal of the receive signal and a second signal, which includes an image signal corresponding to the main signal, with a shift by a baud rate of the receive signal relative to the first signal in a frequency domain, a correlation calculation unit configured to calculate a cross correlation of the first signal and the second signal, and a dispersion amount calculation unit configured to calculate a wavelength dispersion amount, based on a position of a peak of the cross correlation.

8 Claims, 21 Drawing Sheets

(56) References Cited

U.S. PATENT DOCUMENTS

| | | | |
|---|---|---|---|
| 9,614,621 B2* | 4/2017 | Ishihara | H04B 10/556 |
| 9,621,299 B2* | 4/2017 | Ishihara | H04B 10/6161 |
| 2017/0070296 A1 | 3/2017 | Okamoto et al. | |
| 2017/0141943 A1* | 5/2017 | Nazarathy | H04J 11/0023 |
| 2021/0152242 A1* | 5/2021 | Oveis Gharan | H04B 10/07951 |

* cited by examiner

WAVELENGTH DISPERSION AMOUNT ESTIMATION APPARATUS

CROSS-REFERENCE TO RELATED APPLICATIONS

This application is a 371 U.S. National Phase of International Application No. PCT/JP2020/001036 filed on Jan. 15, 2020, which claims priority to Japanese Application No. 2019-014660 filed on Jan. 30, 2019. The entire disclosures of the above applications are incorporated herein by reference.

TECHNICAL FIELD

The present invention relates to a wavelength dispersion amount estimation apparatus.

BACKGROUND ART

Wavelength dispersion is the most common problem of signal distortion that is problematic in optical fiber communications. Wavelength dispersion is caused by the difference in the group velocities of signal light beams propagating in an optical fiber depending on the frequency. Because the signal distortion due to wavelength dispersion is linear distortion, if the wavelength dispersion amount is known, it is nearly possible to completely compensate the signal distortion by providing an inverse wavelength dispersion. The application of the inverse wavelength dispersion is done with a dispersion compensation fiber in the case of a direct detection scheme, but is mainly done in digital signal processing in the case of digital coherent reception schemes.

In a case in which the wavelength dispersion amount is not known, it is necessary to measure or estimate the wavelength dispersion amount of the receive signal in some techniques. There is also a technique in which the wavelength dispersion amount of the transmission line is measured in advance by a measurement device, but in this technique, costs are increased in tens of operation. In contrast, there is also a technique in which a signal processing unit of an optical reception device automatically measures the wavelength dispersion amount and applies inverse dispersion.

For example, as a technique for automatically measuring the wavelength dispersion amount, there is a technique that uses a training sequence having characteristics such that power is concentrated only in specific regions on the high frequency side and the low frequency side of the signal band. By using the training signal having this characteristics, a time delay in the region on the high frequency side and the region on the low frequency side can be determined, and the wavelength dispersion amount is calculated from the calculated time delay (for example, see PTL 1).

There is also a technique to sweep the dispersion compensation amount and automatically detect an appropriate dispersion compensation amount by which dispersion is just compensated, on the basis of indices such as clock extraction sensitivity or peak to average power ratio (PAPR), and the like.

CITATION LIST

Patent Literature

PTL 1: WO 2015/141658

SUMMARY OF THE INVENTION

Technical Problem

However, in the case of a technique of determining a wavelength dispersion amount on the basis of a time delay in a region on a high frequency side and a region on a low frequency side, training signals having characteristics where energy is localized at a specific frequency are required. With training signals having such characteristics, there is a problem that distortion through non-linear optical effects may be severe.

The technique of sweeping the dispersion compensation amount to detect an appropriate dispersion compensation amount also has a problem in that it is not possible to detect the dispersion compensation amount at high speeds due to a long time required for the sweeping.

In view of the above circumstances, an object of the present invention is to provide a technology capable of calculating a wavelength dispersion amount in a little computation time without using a characteristic training signal.

Means for Solving the Problem

An aspect of the present invention is a wavelength dispersion amount estimation apparatus including a correlation signal generation unit configured to generate, from a receive signal, a first signal including a main signal of the receive signal and at least one second signal, which includes an image signal corresponding to the main signal, with a shift by a baud rate of the receive signal relative to the first signal in a frequency domain, a correlation calculation unit configured to calculate a cross correlation of the first signal and the at least one second signal and a dispersion amount calculation unit configured to calculate a wavelength dispersion amount, based on a position of a peak of the cross correlation.

An aspect of the present invention is the wavelength dispersion amount estimation apparatus described above, in which the correlation signal generation unit includes a frequency domain conversion unit configured to convert the receive signal into a frequency domain and output a frequency domain receive signal and a band filter unit configured to define a first section including the main signal of the receive signal in the frequency domain and a second section, which includes the image signal corresponding to the main signal included in the first section, including a leading position at a position separated by the baud rate of the receive signal from a leading position of the first section, filter the frequency domain receive signal in the first section to generate the first signal, and filter the frequency domain receive signal in the second section to generate the at least one second signal.

An aspect of the present invention is the wavelength dispersion amount estimation apparatus described above, in which the receive signal is a Nyquist signal, and the band filter unit filters such that each of the first signal and the at least one second signal is signal corresponding to an entire section or a portion of a section where an amplitude spectrum in a frequency domain of the Nyquist signal is increasing or decreasing.

An aspect of the present invention is the wavelength dispersion amount estimation apparatus described above, in which the receive signal is a Nyquist signal, the correlation signal generation unit includes an inverse Nyquist filter unit configured to apply an inverse Nyquist filter to the frequency domain receive signal, and the band filter unit filters the frequency domain receive signal filtered by the inverse Nyquist filter unit in each of the first section and the second section to generate the first signal and the at least one second signal.

An aspect of the present invention is the wavelength dispersion amount estimation apparatus described above, in which the frequency domain conversion unit divides the receive signal into frames having a predetermined frame length and performs discrete Fourier transform on the receive signal for each of the frames that are divided to convert the receive signal into a frequency domain, or divides the receive signal into division frames having a frame length shorter than the predetermined frame length, the division frames partially overlapping each other, and performs the discrete Fourier transform on the receive signal for each of the division frames that are divided to convert the receive signal into a frequency domain, and when the receive signal is divided into the division frames, the band filter unit filters the frequency domain receive signal corresponding to one of the division frames, which serves as a reference, in the first section to generate the first signal, and filters the frequency domain receive signal corresponding to another of the division frames in the second section to generate a plurality of second signals of the at least one second signal, the correlation calculation unit calculates a cross correlation between the first signal corresponding to the one of the division frames serving as the reference and each of the plurality of second signals corresponding to the other of the division frames, and the dispersion amount calculation unit calculates a wavelength dispersion amount, based on a position of another division frame of the other of the division frames including a maximum value of a peak value in a result of the cross correlation and a position at which a peak of the maximum value is obtained in a cross correlation of the other division frame.

An aspect of the present invention is the wavelength dispersion amount estimation apparatus described above, in which the correlation signal generation unit includes a branching device configured to branch the receive signal into two receive signals, an oscillator configured to output an oscillating signal at an oscillation frequency of one half of the baud rate of the receive signal, a first multiplier configured to multiply one of the two receive signals obtained through branching by the branching device and the oscillating signal output by the oscillator to generate and output the first signal, and a second multiplier configured to multiply one of the two receive signals obtained through branching by the branching device and a complex conjugate of the oscillating signal output by the oscillator to generate and output the second signal.

An aspect of the present invention is the wavelength dispersion amount estimation apparatus described above, further including a first low pass filter provided at an output of the first multiplier, and a second low pass filter provided at an output of the second multiplier, in which the first low pass filter filters, at a blocking frequency predetermined, the first signal output by the first multiplier to generate the first signal including a high frequency component of the receive signal, and the second low pass filter filters, at the blocking frequency, the second signal output by the second multiplier to generate the second signal including a low frequency component of the receive signal.

An aspect of the present invention is the wavelength dispersion amount estimation apparatus described above, further including a baud rate estimation processing unit, in which the baud rate estimation processing unit includes a correlation signal generation unit configured to generate two correlation signals with a frequency difference, from the receive signal, a correlation calculation unit configured to calculate a cross correlation of the two correlation signals, and a baud rate detection unit configured to calculate the baud rate of the receive signal, based on the frequency difference of the two correlation signals when a peak is obtained in the cross correlation.

Effects of the Invention

According to the present invention, a wavelength dispersion amount can be calculated in little computation time without using a characteristic training signal.

DESCRIPTION OF EMBODIMENTS

First Embodiment

Figure 1:
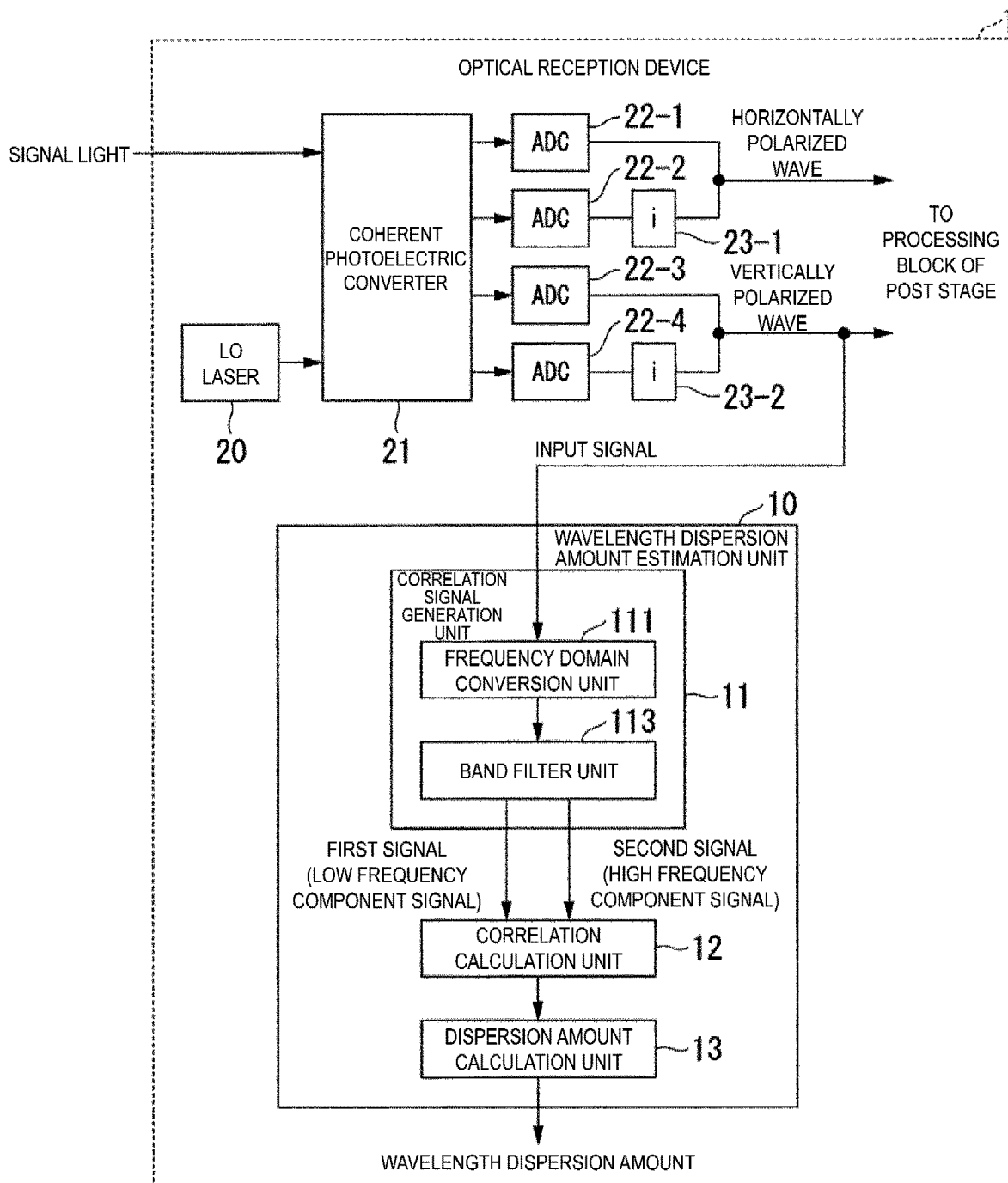
FIG. 1 is a block diagram illustrating a configuration of an optical reception device including a wavelength dispersion amount estimation unit according to a first embodiment.
Figure 2:
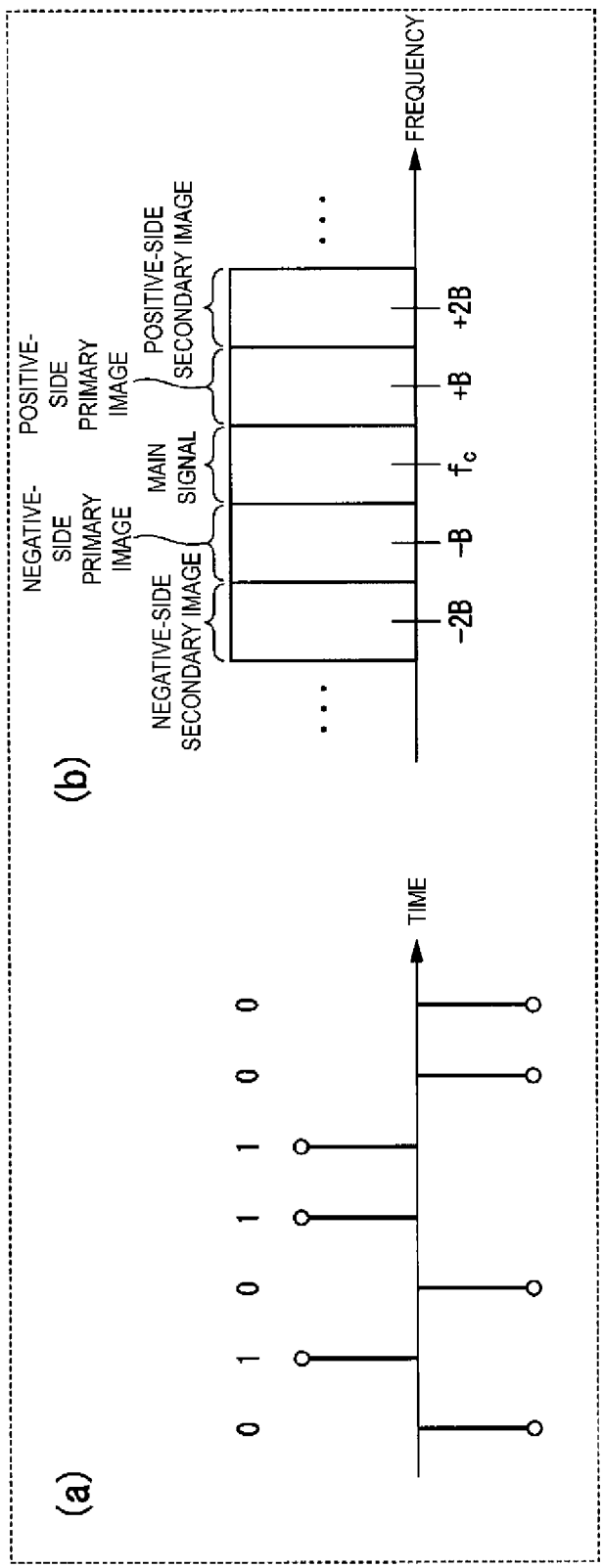
FIG. 2 is a diagram illustrating a time waveform and a spectrum of an impulse signal.

Embodiments of the present invention will be described below with reference to the drawings. FIG. 1 is a block diagram illustrating a configuration of an optical reception device 1 included in a wavelength dispersion amount estimation unit 10 (a wavelength dispersion amount estimation apparatus) according to a first embodiment. The optical reception device 1 is an optical reception device that receives signal light in a so-called digital coherent scheme and includes a local oscillator (LO) laser 20, a coherent photoelectric converter 21, analog-to-digital converters (ADCs) 22-1 to 22-4, imaginary unit multiplication units 23-1 and 23-2, and the wavelength dispersion amount estimation unit 10.

The LO laser 20 is a local oscillation laser, and outputs localized oscillating light having a phase matching the frequency of the signal light. The coherent photoelectric converter 21 uses the local oscillating light output by the LO laser 20 to perform optical homodyne coherent detection on the received signal light to convert the signal light into an electrical signal in a baseband of four lanes.

Each of the four ADCs 22-1 to 22-4 acquires a corresponding one of four lanes of electrical signal output by the coherent photoelectric converter 21 and converts the electrical signal into a digital signal. The four lanes of digital signals are the in-phase and orthogonal components of the horizontally polarized wave of the signal light as well as the in-phase and orthogonal components of the vertically polarized wave. The imaginary unit multiplication units 23-1 and 23-2 are connected respectively to the ADCs 22-2 and 22-4 that output the orthogonal components.

The imaginary unit multiplication unit 23-1 advances the phase of the orthogonal components output by the ADC 22-2, by 90 degrees on the complex plane, and outputs the result. The output of the ADC 22-1 and the output of the imaginary unit multiplication unit 23-1 are combined, and the receive signal of the horizontally polarized wave is generated with the in-phase component output by the ADC 22-1 as the real component and the orthogonal component output by the imaginary unit multiplication unit 23-1 as the imaginary component.

The imaginary unit multiplication unit 23-2 advances the phase of the orthogonal components output by the ADC 22-4, by 90 degrees advanced on the complex plane. The output of the ADC 22-3 and the output of the imaginary unit multiplication unit 23-2 are combined, and the receive signal of the vertically polarized wave is generated with the in-phase component output by the ADC 22-3 as the real component and the orthogonal component output by the imaginary unit multiplication unit 23-2 as the imaginary component.

The receive signal of the horizontally polarized wave and the receive signal of the vertically polarized wave expressed in complex numbers are supplied to the processing blocks of the digital signal posterior stage of the optical reception device 1. The wavelength dispersion amount estimation unit 10 acquires the receive signal of the vertically polarized wave as an input signal, and estimates the wavelength dispersion amount by an alias correlation method. Here, the alias correlation method is a technique for estimating the wavelength dispersion amount by using the temporal correlation between the main signal in the frequency domain of the receive signal and the image signal corresponding to the main signal.

Here, a digital input signal acquired by the wavelength dispersion amount estimation unit 10 will be described. In the digital data transmission, an optical transmission device and the optical reception device 1 connected with the transmission line transmit and receive a sequence of temporally discrete symbols. When a symbol sequence is transmitted in the transmission line, the waveform of the signal corresponding to the symbol sequence is a continuous value rather than a discrete value. As such, the symbol sequence, which is a discrete value, is converted to a signal of a continuous value by a waveform shaping scheme such as, for example, return-to-zero (RZ), non return-to-zero (NRZ), Nyquist, and the like.

FIGS. 2 to 5 are diagrams each illustrating a time waveform and a spectral waveform in the frequency domain for each waveform shaping scheme of each of impulse, RZ, NRZ, and Nyquist. In the diagrams of time waveforms of FIGS. 2(a), 3(a), 4(a), and 5(a), the horizontal axis is time and the vertical axis is the power value. In the diagrams of the spectral waveforms of FIGS. 2(b), 3(b), 4(b), and 5(b), the horizontal axis is the frequency, and the vertical axis is the power value, i.e. the power spectrum. Note that the vertical axis in the diagrams of FIGS. 2(b), 3(b), 4(b), and 5(b) is in a linear notation rather than a logarithmic notation. The unit of frequency is "baud", which represents a baud rate, and the relationship to "Hz", which is a common unit representing the frequency, is, for example, a relationship of 1000 baud=1000 Hz.

FIG. 2(a) is a diagram illustrating a time waveform of a signal of an impulse waveform (hereinafter referred to as an "impulse signal"). Although impulse signals are not actually utilized, the waveforms are the most fundamental waveforms. The waveform of the impulse signal is a waveform in which short pulses are arranged to indicate the data at the symbol positions on the time axis. As illustrated in FIG. 2(b), the spectral waveform of the impulse signal has a rectangular main signal near the carrier frequency fc, and has an image signal obtained by translating the main signal at a position for each frequency B, i.e., ±B, ±2B, . . . . Here, "B" is the symbol rate, or baud rate, of the impulse signal. An ideal impulse signal will result in infinity of image signals.

Figure 3:
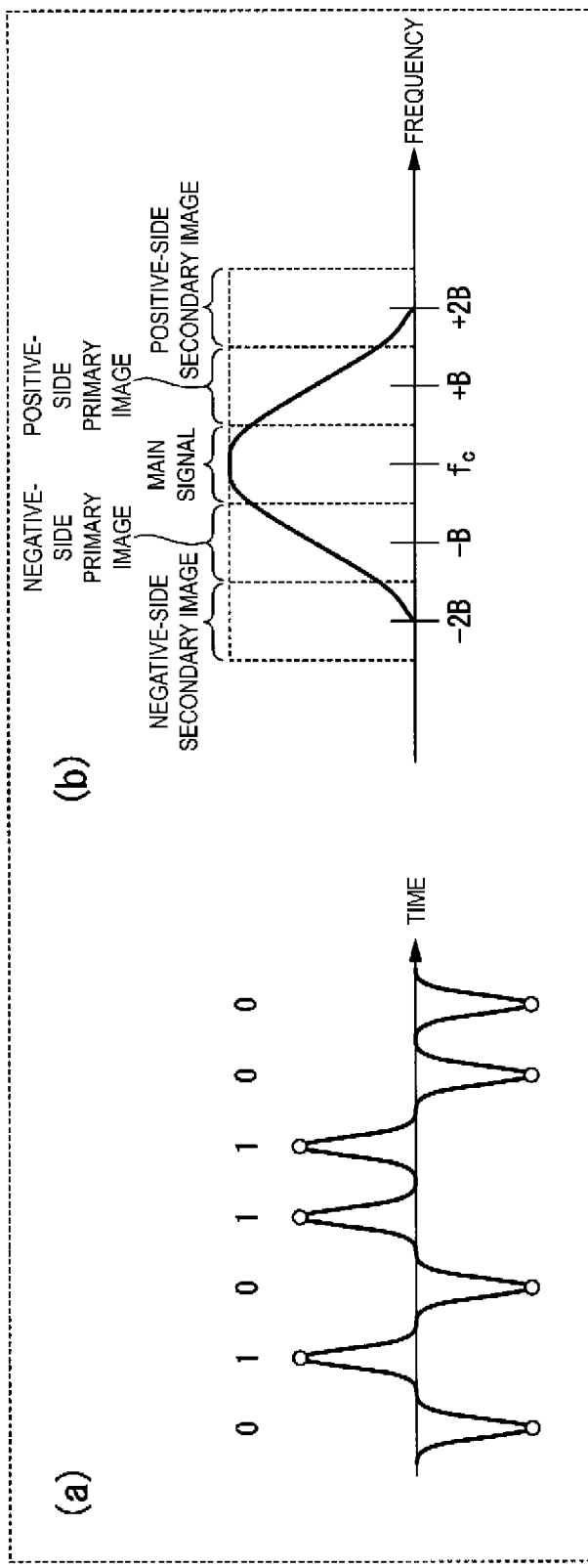
FIG. 3 is a diagram illustrating a time waveform and a spectrum of a RZ signal.
Figure 4:
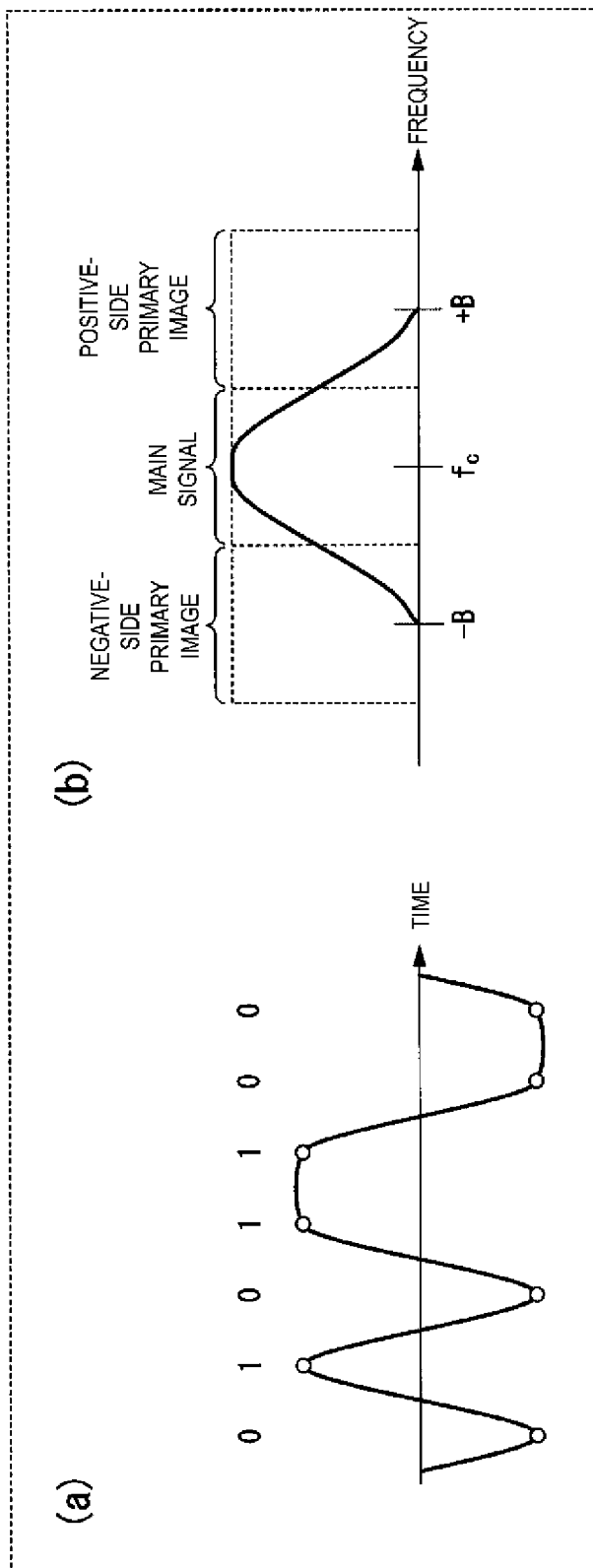
FIG. 4 is a diagram illustrating a time waveform and a spectrum of a NRZ signal.
Figure 5:
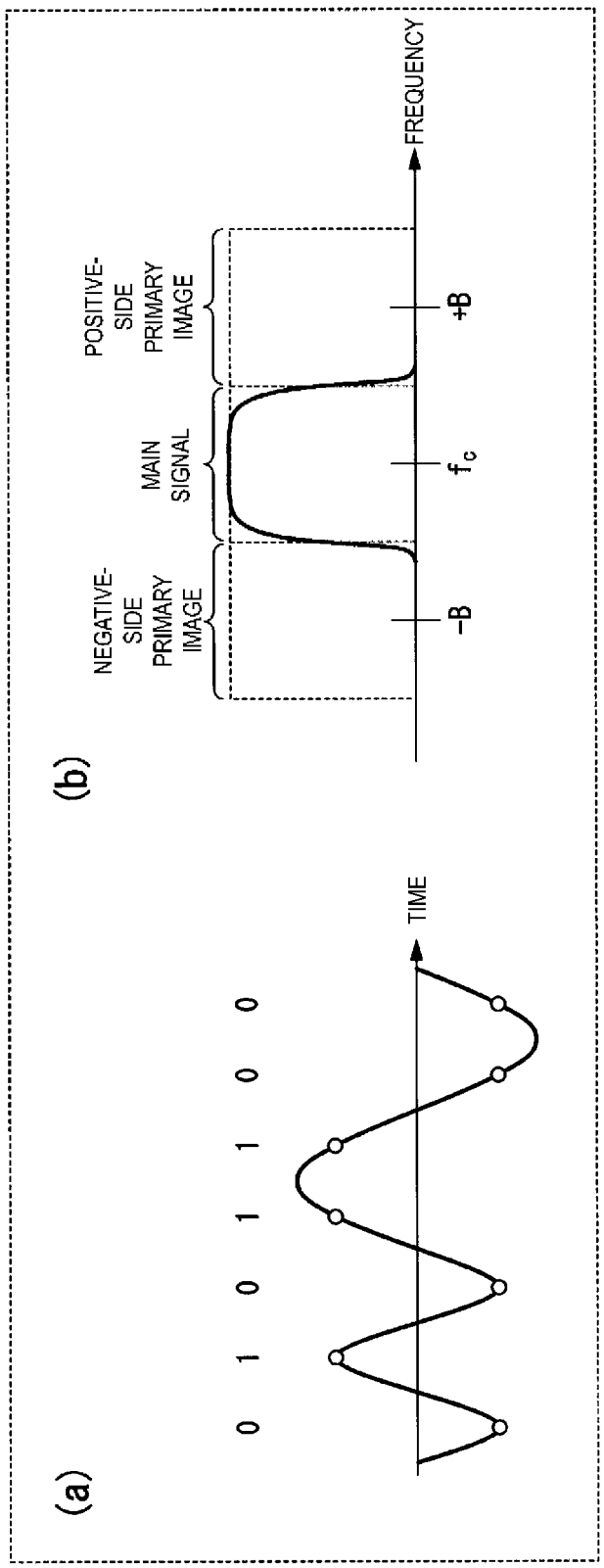
FIG. 5 is a diagram illustrating a time waveform and a spectrum of a Nyquist signal.

The diagrams of FIGS. 3, 4, and 5 are diagrams illustrating the time waveforms and the spectral waveforms in the frequency domain of the signal of the RZ waveform, the signal of the NRZ waveform, the signal of the Nyquist waveform, respectively (hereinafter referred to as the "RZ signal", "NRZ signal", and "Nyquist signal"). The baud rate of the RZ signal, NRZ signal, and Nyquist signal is all "B". The actual waveform shaping, such as RZ, NRZ, Nyquist, and the like, can be considered to be a waveform obtained by filtering the spectrum of the impulse signal with a band pass filter with a carrier frequency fc as the center frequency.

The shape of the band pass filter is in the form of a raised cosine filter having a null point at a position of ±2B as illustrated in FIG. 3(b), in a case of generating the RZ signal. In a case of generating the NRZ signal, the shape of the band pass filter is in the form of a raised cosine filter having a null point at a position of ±B as illustrated in FIG. 4(b). In a case of generating the Nyquist signal, the band pass filter is in the form in which only the transition portion of the rectangular filter (around ±B/2) is a raised cosine filter as illustrated in FIG. 5(b).

From the diagrams of FIGS. 3(b), 4(b) and 5(b), it can be seen that even in any of the waveform shaping of the RZ, NRZ, and Nyquist, the image signal, which is a copy of the main signal, is present in a frequency domain different from the main signal.

Figure 6:
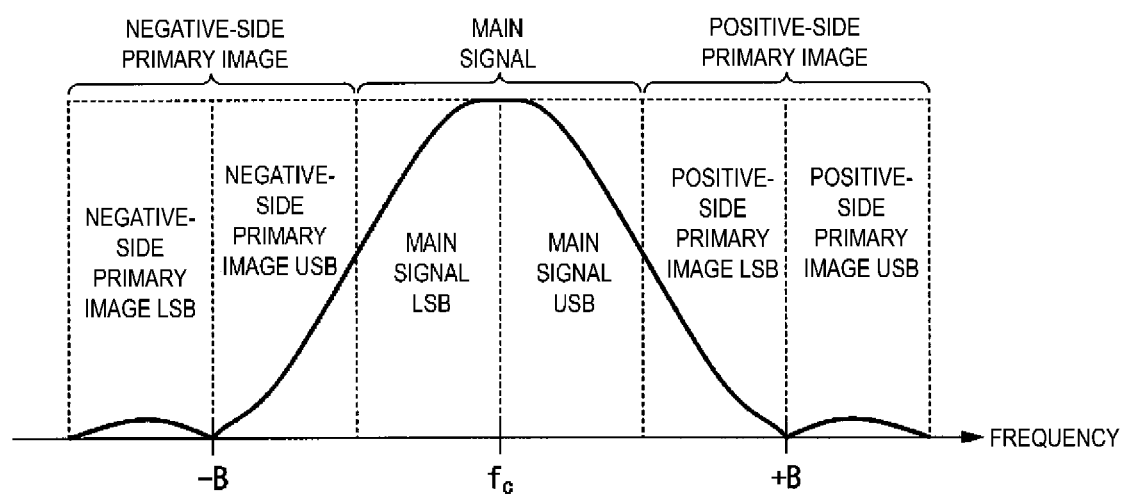
FIG. 6 is a diagram illustrating a spectrum of an NRZ signal.

For example, FIG. 6 is a diagram illustrating details of the spectral waveform in the frequency domain of the NRZ signal. As illustrated in FIG. 6, each of the main signal, positive-side primary image signal, and negative-side primary image signal includes two side wave bands: upper side band (USB), and lower side band (LSB).

The positive-side primary image signal corresponding to the USB, i.e., the main signal of the upper side wave band, appears in the range of frequency +B to frequency +3/2B, and negative-side primary image signal appears in the range of frequency −1/2B to frequency −B. The positive-side primary image signal corresponding to the LSB, i.e., the main signal of the lower side wave band, appears in the range of frequency +1/2B to frequency +B, and the negative-side primary image signal appears in the range of frequency −B to frequency −3/2B.

Regarding Alias Correlation Method

Figure 7:
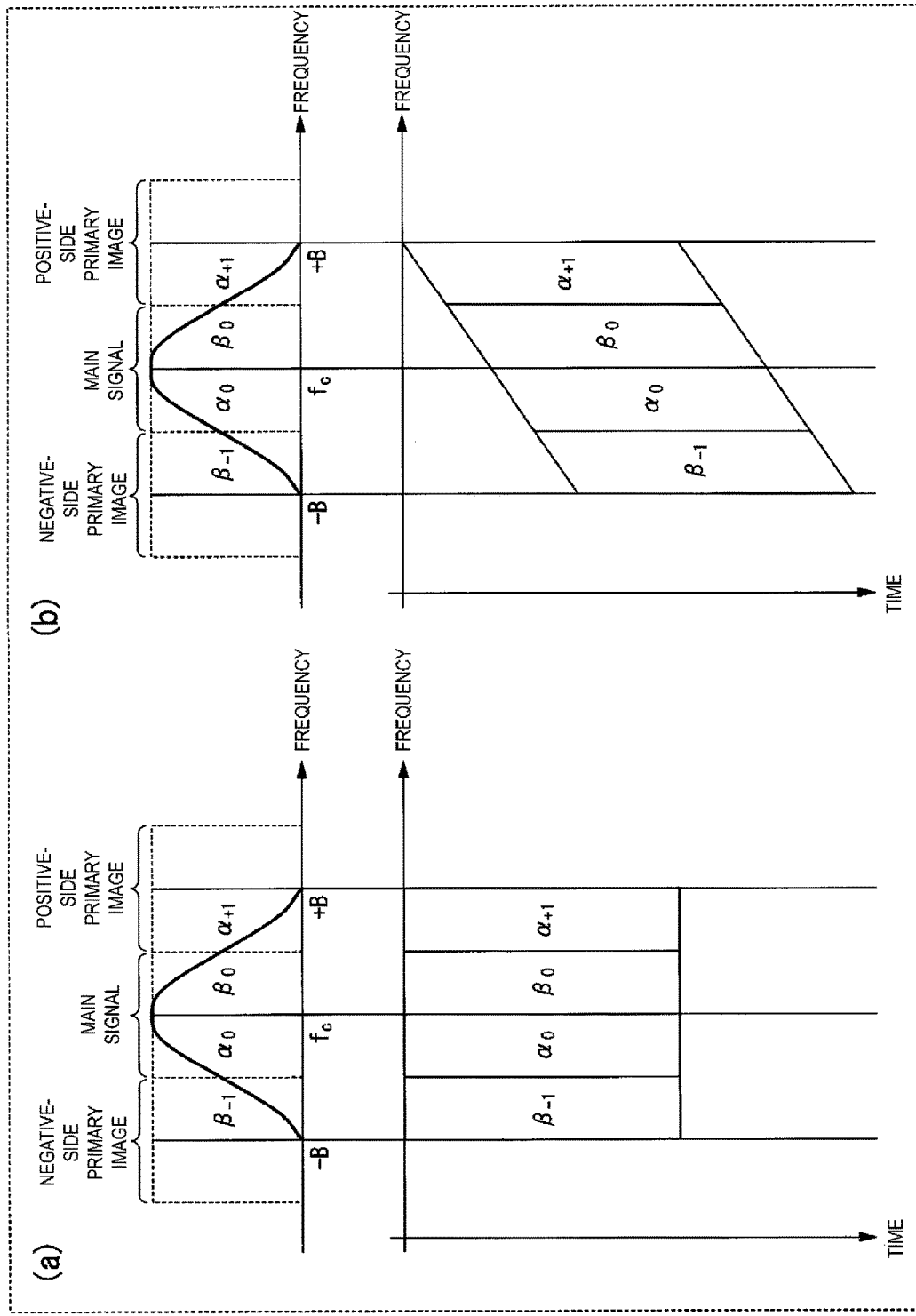
FIG. 7 is a diagram illustrating a spectrum of an NRZ signal and spectrograms before and after applying wavelength dispersion.

The wavelength dispersion occurs due to a different delay occurring for each frequency component of the signal. FIG. 7 is a diagram illustrating the spectral waveform of NRZ and the spectrograms of the NRZ signal before and after applying wavelength dispersion to the NRZ signal. The spectrograms are graphs plotting signal strength with the horizontal axis as the frequency axis and the vertical axis as the time axis, for example. The lower diagram in FIG. 7(a) is a diagram illustrating the spectrogram before applying wavelength dispersion, and the lower diagram in FIG. 7(b) is a diagram illustrating the spectrogram after applying wavelength dispersion.

Comparing FIGS. 7(a) and 7(b) and FIG. 6, the portion of $\alpha_0$ is located at a portion of the lower side wave band of the main signal and the portion of $\beta_0$ is located at a portion of the upper side wave band of the main signal. The portion of $\alpha_{+0}$ is the positive-side primary image signal corresponding to $\alpha_0$, which is the portion of the lower side wave band of the main signal, and the portion of $\beta_{-1}$ is the negative-side primary image signal corresponding to $\beta_0$, which is the portion of the upper side wave band of the main signal. In other words, the image signal $\alpha_{+1}$ corresponding to the main signal $\alpha_0$ is generated adjacent to the high frequency side of the main signal $\beta_0$. The image signal $\beta_{-1}$ corresponding to the main signal $\beta_0$ is generated adjacent to the low frequency side of the main signal $\alpha_0$.

$\alpha_0$ and $\alpha_{+1}$ are different in amplitude spectrum, due to the impact of the band pass filter generating the waveform of NRZ, but the time waveforms are very similar. $\beta_0$ and $\beta_{-1}$ also differ in amplitude spectrum, but the time waveforms are very similar. In each of the lower side wave band and the upper side wave band of the entire NRZ signal, both and a are aligned in this order. As such, the time waveforms of the lower side wave band and the upper side wave band can be considered to be very similar waveforms.

When a wavelength dispersion occurs, spectrograms that have been rectangular will have a delay in accordance with the value of the frequency. Thus, as illustrated in the lower diagram in FIG. 7(b), the spectrogram deforms into diamonds. Comparing the lower side wave band $\beta_{-1}$ and $\alpha_0$ and the upper side wave band $\beta_0$ and $\alpha_{+1}$, it can be seen that relative delays have occurred in accordance with the value of the frequency, with the delay amount of the lower side wave band being larger than that of the upper side wave band and each being deformed into a similar diamond shape.

That is, the lower side wave band and upper side wave band have very similar time waveforms and both receive the effect of wavelength dispersion as well. As a result, as illustrated in the diagram below FIG. 7(b), relative delays will be experienced in accordance with the wavelength dispersion amount. Thus, by extracting the lower side wave band and the upper side wave band of the receive signal and calculating the delay amount for the time correlation between the lower side wave band and the upper side wave band, the wavelength dispersion amount of the receive signal can be measured.

Configuration of Wavelength Dispersion Amount Estimation Unit According to First Embodiment Returning to FIG. 1, the wavelength dispersion amount estimation unit 10 includes a correlation signal generation unit 11 (a correlation signal generator), a correlation calculation unit 12 (a correlation calculator), and a dispersion amount calculation unit 13 (a dispersion amount calculator). The correlation signal generation unit 11 acquires the receive signal of the vertically polarized wave as an input signal and generates a first signal including the main signal and a second signal having a shift of "B", which is a baud rate of the receive signal relative to the first signal in the frequency domain, and including an image signal corresponding to the main signal.

The correlation signal generation unit 11 includes a frequency domain conversion unit 111 (a frequency domain converter) and a band filter unit 113 (a band filter).

The frequency domain conversion unit 111 converts the acquired input signal into a frequency domain by, for example, discrete Fourier transform. Here, the frequency domain conversion unit 111 performs fast Fourier transform (hereinafter referred to as "FFT") that computes the discrete Fourier transform at high speed, for example.

The band filter unit 113 selects two sections in the frequency domain for generating the first signal and the second signal as described above from the receive signal that has been frequency converted by filtering. When selecting the two sections, the band filter unit 113 performs selection such that either one of the sections includes at least the entire main signal or a portion of the main signal. The band filter unit 113 performs selection such that the other section includes an image signal corresponding to a portion of the main signal included in one section. The band filter unit 113 performs selection such that leading positions of the two sections are separated by the baud rate B of the receive signal.

Figure 8:
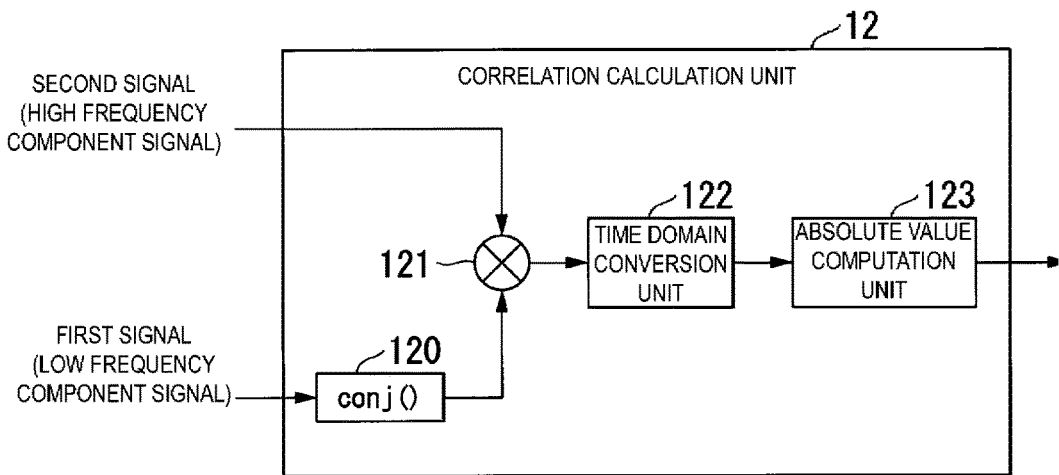
FIG. 8 is a block diagram illustrating an internal configuration of a correlation calculation unit according to the first embodiment.

The correlation calculation unit 12 calculates the cross correlation between the first signal and the second signal. As illustrated in FIG. 8, for example, the correlation calculation unit 12 includes a complex conjugate computation unit 120, a multiplier 121, a time domain conversion unit 122, and an absolute value computation unit 123.

The complex conjugate computation unit 120 acquires the first signal generated by filtering in one section selected by the band filter unit 113, and calculates and outputs the complex conjugate of the acquired first signal. The multiplier 121 multiplies the second signal generated by the band filter unit 113 filtering in the other section and the complex conjugate of the first signal output by the complex conjugate computation unit 120, and outputs the result. The time domain conversion unit 122 converts the signal output by the multiplier 121 into a time domain, for example, by inverse discrete Fourier transform. Here, the time domain conversion unit 122 performs inverse fast Fourier transform (hereinafter referred to as "IFFT") that computes the inverse discrete Fourier transform at high speed, for example.

The absolute value computation unit 123 outputs the absolute value of the value output by the time domain conversion unit 122. The value of the absolute value output by the absolute value computation unit 123 indicates the cross correlation between the first signal and the second signal. The dispersion amount calculation unit 13 calculates the wavelength dispersion amount on the basis of the position of the peak included in the result of the cross correlation calculated by the correlation calculation unit 12.

Figure 9:
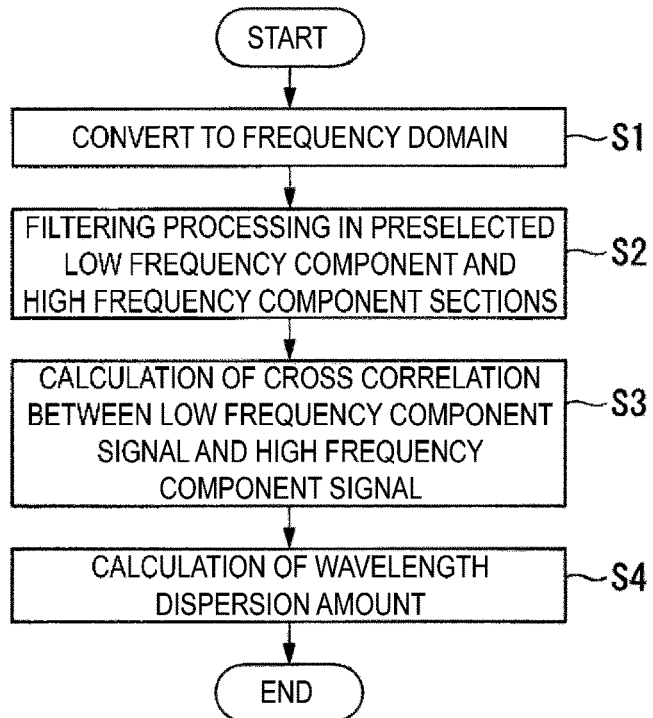
FIG. 9 is a flowchart illustrating a procedure of processing of the wavelength dispersion amount estimation unit according to the first embodiment.

Processing by Wavelength Dispersion Amount Estimation Unit According to First Embodiment Next, the processing by the wavelength dispersion amount estimation unit 10 according to the first embodiment will be described with reference to FIGS. 9 and 10. FIG. 9 is a flowchart illustrating a flow of processing by the wavelength dispersion amount estimation unit 10.

Before the processing illustrated in FIG. 9 is initiated, the band filter unit 113 selects two sections in advance, as two sections described above as illustrated in FIG. 10, e.g., a section of a high frequency band (hereinafter referred to as a "high frequency band section 130") and a section of a low frequency band (hereinafter referred to as a "low frequency band section 131"). The following two conditions are preset as conditions for the band filter unit 113 to select the high frequency band section 130 and the low frequency band section 131.

Figure 10:
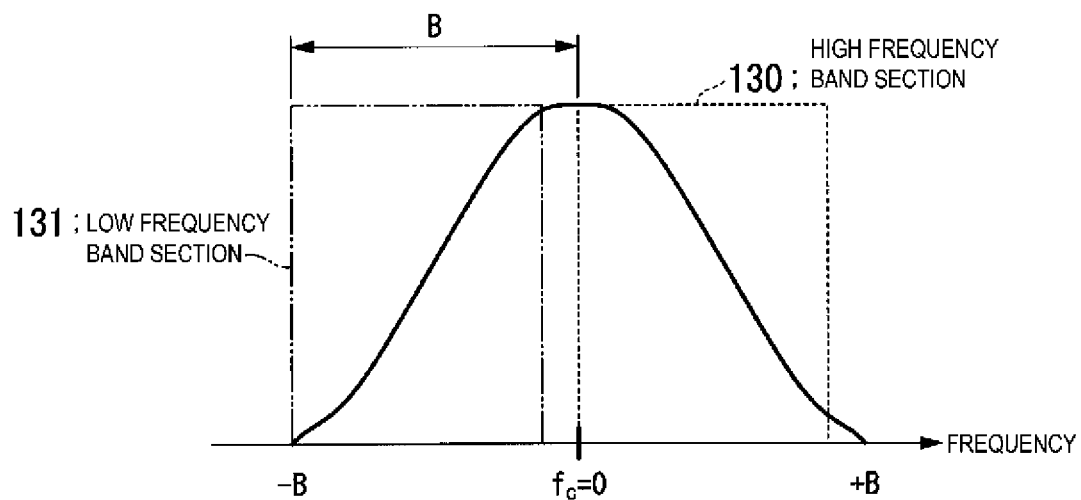
FIG. 10 is a diagram illustrating an example of two sections selected by a band filter unit in the frequency domain according to the first embodiment.

The first selection condition is that the lowest frequency value, i.e., the leading position, of the low frequency band section 131 is separated from the leading position of the high frequency band section 130 by the baud rate B of the receive signal, as illustrated in FIG. 10.

The second selection condition is that the signal obtained by filtering in the high frequency band section 130 and the signal obtained by filtering in the low frequency band section 131 at least partially overlap, i.e., the integral value of the two signals is not zero.

For example, the band filter unit 113 selects the high frequency band section 130 and the low frequency band section 131 as follows on the basis of the first and second selection conditions. In other words, the band filter unit 113 selects a section including the entire upper side wave band or a portion of the upper side wave band of the main signal as the high frequency band section 130. At this time, when the low frequency band section 131 is selected in a position that satisfies the first selection condition, the low frequency band section 131 will include the negative-side primary image signal corresponding to the portion of the main signal included in the high frequency band section 130. However, the length of the low frequency band section 131 needs to be similar to the length of the high frequency band section 130.

As a result, the signal corresponding to the high frequency band section 130 and the signal corresponding to the low frequency band section 131 will partially overlap, which satisfies the second selection condition.

The band filter unit 113 may select a section including the entire lower side wave band or a portion of the lower side wave band of the main signal as the low frequency band section 131, in an opposite way to the selection described above. At this time, when the high frequency band section 130 is selected in a position that satisfies the first selection condition, the high frequency band section 130 will include the positive-side primary image signal corresponding to a portion of the main signal included in the low frequency band section 131. However, the length of the section of the high frequency band section 130 needs to be similar to the length of the low frequency band section 131. As a result, the signal corresponding to the low frequency band section 131 and the signal corresponding to the high frequency band section 130 will partially overlap, which satisfies the second selection condition.

Furthermore, as illustrated in FIG. 10, the band filter unit 113 may select a section including the entire upper side wave band or a portion of the upper side wave band of the main signal and the entire positive-side primary image signal or a portion of the positive-side primary image signal up to frequency +B adjacent to the upper side wave band of the main signal on the high frequency side as the high frequency band section 130. At this time, when the low frequency band section 131 is selected in a position that satisfies the first selection condition, the low frequency band section 131 will include the negative-side primary image signal corresponding to the portion of the main signal of the upper side wave band included in the high frequency band section 130, and the main signal of the lower side wave band corresponding to the portion of the positive-side primary image signal. However, the length of the section of the low frequency band section 131 needs to be similar to the length of the high frequency band section 130. As a result, the signal corresponding to the high frequency band section 130 and the signal corresponding to the low frequency band section 131 will partially overlap, which satisfies the second selection condition.

As illustrated in FIG. 9, when the frequency domain conversion unit 111 of the correlation signal generation unit 11 acquires the vertically polarized wave of the receive signal as an input signal, the frequency domain conversion unit 111 converts the acquired input signal into a frequency domain by FFT (step S1).

The band filter unit 113 filters in the high frequency band section 130 selected in advance to generate a high frequency component signal. The band filter unit 113 filters in the low frequency band section 131 selected in advance to generate a low frequency component signal (step S2).

In a case in which the low frequency band section 131 includes at least a portion of the main signal, the low frequency component signal corresponds to the first signal described above and the high frequency component signal corresponds to the second signal. Conversely, in a case in which the high frequency band section 130 includes at least a portion of the main signal, the high frequency component signal corresponds to the first signal and the low frequency component signal corresponds to the second signal. In a case in which both the high frequency band section 130 and the low frequency band section 131 include at least a portion of the main signal, either the high frequency component signal or the low frequency component signal corresponds to the first signal and the other corresponds to the second signal.

Here, the following description will be given assuming that the low frequency component signal corresponds to the first signal, and the high frequency component signal corresponds to the second signal.

The complex conjugate computation unit 120 of the correlation calculation unit 12 calculates and outputs the complex conjugate of the low frequency component signal output by the band filter unit 113. The multiplier 121 multiplies the high frequency component signal output by the band filter unit 113 and the complex conjugate of the low frequency component signal and outputs the result. The time domain conversion unit 122 converts the signal output by the multiplier 121 to a signal in the time domain by IFFT.

The absolute value computation unit 123 outputs the absolute value of the value output by the time domain conversion unit 122. The value of the absolute value output by the absolute value computation unit 123 represents the cross correlation between the low frequency component signal and the high frequency component signal (step S3).

When similar waveforms are included in the high frequency component signal and the low frequency component signal, a peak will appear at the position where the waveforms match in the cross correlation. In a case in which there is no delay due to the wavelength dispersion, a peak will appear in a case in which the leading position of the high frequency component signal matches the leading position of the low frequency component signal. In contrast, in a case in which a delay due to wavelength dispersion occurs, a peak appears at a position where the leading position of the high frequency component signal and the leading position of the low frequency component signal are separated by the length corresponding to the delay.

The peak position is $\tau$ [ps], and the wavelength difference between the high frequency component and the low frequency component is $\Delta$ [nm].

The baud rate B [baud] described above indicates the frequency difference of the leading positions of the low frequency band section 131 and the high frequency band section 130, and the wavelength difference $\Delta$ [nm] is obtained when the frequency difference is converted to the wavelength difference. The dispersion amount calculation unit 13 calculates the wavelength dispersion amount D [ps/nm] according to the following Equation (1) (step S4).

$$D = \tau/\Delta \quad (1)$$

In the configuration according to the first embodiment described above, the frequency domain conversion unit 111 of the correlation signal generation unit 11 converts the input signal into the frequency domain with the receive signal as the input signal, and outputs a frequency domain receive signal. The band filter unit 113 defines the first section including the main signal of the input signal in the frequency domain, and the second section including an image signal corresponding to the main signal included in the first section and having a leading position at the position separated by the baud rate of the input signal from the leading position of the first section, filters the frequency domain receive signal in the first section to generate the first signal, and filters the frequency domain receive signal in the second section to generate the second signal. The correlation calculation unit 12 calculates the cross correlation between the first signal and the second signal. The dispersion amount calculation unit 13 calculates the wavelength dispersion amount on the basis of the position of the peak of the cross correlation. As a result, the position of the peak in the result of the cross correlation indicates the delay amount caused by the wavelength dispersion, and it is possible to calculate the wavelength dispersion amount from the position of the peak. The configuration according to the first embodiment is a method referred to as a blind scheme for calculating a wavelength dispersion amount without using a training signal, in contrast to a training scheme using a training signal. The configuration according to the first embodiment is not a parameter scanning scheme that requires a long time to sweep a dispersion compensation amount to detect a wavelength dispersion amount. Thus, the wavelength dispersion amount can be calculated in a little computation time without using a characteristic training signal.

Note that in the first embodiment described above, it is sufficient that either the high frequency band section 130 or the low frequency band section 131 includes a portion of the main signal, but it is desirable to include a portion of the main signal as much as possible. The more the overlapping portions are in the two signals, the more distinct peak can be obtained.

Furthermore, as a section of the high frequency band section 130 and the low frequency band section 131, as illustrated in FIG. 10, it is more desirable to select large sections each including the main signal and the image signal adjacent to the main signal, rather than narrow sections each of which includes the main signal. In this way, there may be more overlapping portions in two signals, resulting in more distinct peaks in the result of the cross correlation.

Note that in the first embodiment described above, the sections of the high frequency band section 130 and the low frequency band section 131 selected by the band filter unit 113 may be separated as illustrated in FIG. 10 or continuous. A portion of the section of the high frequency band section 130 and the section of the low frequency band section 131 may overlap. The section lengths of the sections of the high frequency band section 130 and the low frequency band section 131 are preferably the same, but may not be the same. However, in a case in which the time domain conversion unit 122 of the correlation calculation unit 12 described above performs IFFT, the section lengths of the high frequency band section 130 and the low frequency band section 131 need to be the same.

In the configuration according to the first embodiment described above, the correlation calculation unit 12 has the configuration illustrated in FIG. 8 and, by multiplying with the frequency domain to return the domain to the time domain, calculates the cross correlation. However, the configuration of the present invention is not limited to the present embodiment. For example, the first signal and the second signal may be converted to the time domain by IFFT to calculate the cross correlation by convolution of the time domain.

In the first embodiment described above, the spectrograms illustrated in FIG. 7 have the horizontal axis as the frequency axis and the vertical axis as the time axis. However, the horizontal axis may represent the time axis, and the vertical axis may represent the frequency axis. Although FIG. 7 is a schematic diagram, a similar spectrogram can also be generated from actual signal data by using a wavelet transform.

In the first embodiment described above, the band filter unit 113 selects sections of the high frequency band section 130 and the low frequency band section 131 so as to satisfy the first and second selection conditions. In the case of the RZ signal and the NRZ signal, by satisfying the first and second selection conditions described above, a peak can be obtained by the cross correlation calculated by the correlation calculation unit 12. In contrast, in the case of the Nyquist signal, the majority of the image signal has been removed by the band pass filter. As a result, noise increases in the result of the cross correlation, and a good peak cannot be obtained.

Figure 11:
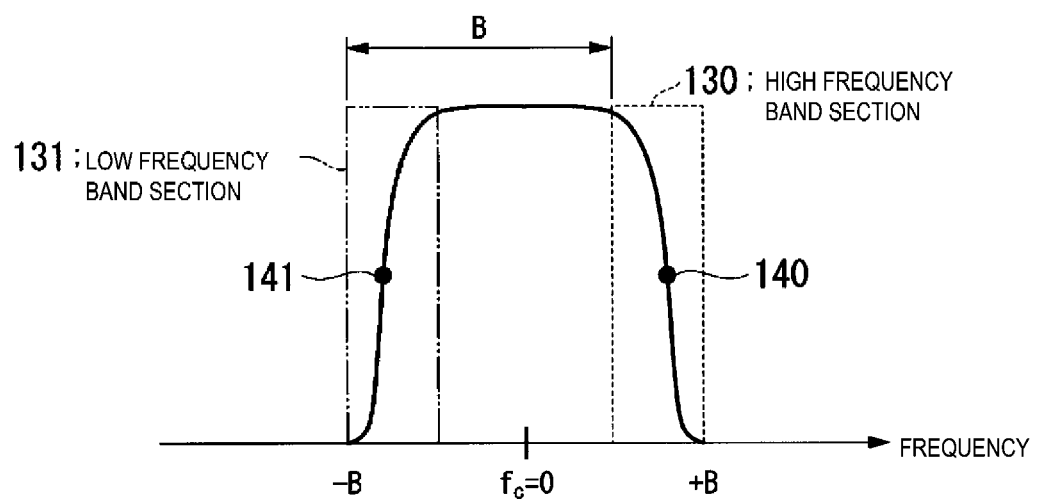
FIG. 11 is a diagram illustrating an example of two sections selected by the band filter unit in the frequency domain in the case of the Nyquist signal according to the first embodiment.

FIG. 11 is a diagram illustrating the spectral waveform of the Nyquist signal, with the roll off transition points 140 and 141 in the positions illustrated in FIG. 11. In the case of the Nyquist signal, the band filter unit 113 selects the entire section or a portion of the section from at least the high frequency side roll off transition point 140 to +B, which is the null point, for example, as the high frequency band section 130. In other words, the band filter unit 113 selects a section of the portion of the positive-side primary image signal corresponding to the main signal of the lower side wave band in which the amplitude spectrum is decreasing as the high frequency band section 130. At this time, when the low frequency band section 131 is selected so as to satisfy the first selection condition, the low frequency band section 131 will include the main signal of the lower side wave band corresponding to the portion of the positive-side primary image signal included in the high frequency band section 130. However, the length of the low frequency band section 131 should be the same as or similar to the length of the high frequency band section 130.

In contrast to the above, the band filter unit 113 selects the entire section or a portion of the section from at least −B, which is the low frequency side null point, to the roll off transition point 141 as a section of the low frequency band section 131. In other words, the band filter unit 113 selects a section of the portion of the negative-side primary image signal corresponding to the main signal of the upper side wave band in which the amplitude spectrum is increasing as the low frequency band section 131. At this time, when the high frequency band section 130 is selected so as to satisfy the first selection condition, the high frequency band section 130 will include the main signal of the upper side wave band corresponding to the portion of the negative-side primary image signal included in the low frequency band section. However, the length of the high frequency band section 130 should be the same as or similar to the length of the low frequency band section 131.

Furthermore, as illustrated in FIG. 11, the band filter unit 113 may select the entire section in which the amplitude spectrum is decreasing, that is, the section spanning the main signal of the upper side wave band and the positive-side primary image signal, or may select a portion of the section spanning the main signal of the upper side wave band and the positive-side primary image signal, as the high frequency band section 130. At this time, when the low frequency band section 131 is selected so as to satisfy the first selection condition, the low frequency band section 131 will be a section that includes the portion in which the amplitude spectrum including the signal corresponding to the main signal and the positive-side primary image signal included in the high frequency band section 130 is increasing. However, the length of the low frequency band section 131 should be the same as or similar to the length of the high frequency band section 130.

As a result, even in the case of the Nyquist signal, the signal corresponding to the high frequency band section 130 and the signal corresponding to the low frequency band section 131 will partially overlap, which satisfies the second selection condition. In addition, because the section is selected by narrowing the portion where the image signal is present, noise can be reduced, and a more distinct peak can be obtained in the cross correlation.

Note that the band filter unit 113 may filter in two stages as described below, rather than directly selecting the high frequency band section 130 and the low frequency band section 131 narrowing the sections in the vicinity of the roll off transition points 140 and 141. That is, the band filter unit 113 may first select the high frequency band section 130 and the low frequency band section 131 such as in FIG. 10 so as to satisfy the second selection condition, further apply, to the signal obtained by filtering in the selected two sections, a band pass filter narrowing in the vicinity of the roll off transition points 140 and 141 as illustrated in FIG. 11, and generate a low frequency component signal and a high frequency component signal.

Note that by configuring the band filter unit 113 for the Nyquist signal described above, a peak can be obtained by the cross correlation of the correlation calculation unit 12 even in the case of the RZ signal or the NRZ signal. As such, it is advantageous to configure the band filter unit 113 for the Nyquist signal in that it can be applied to any of the Nyquist signal, the RZ signal, and the NRZ signal, in application.

Another Configuration Example of First Embodiment

Figure 12:
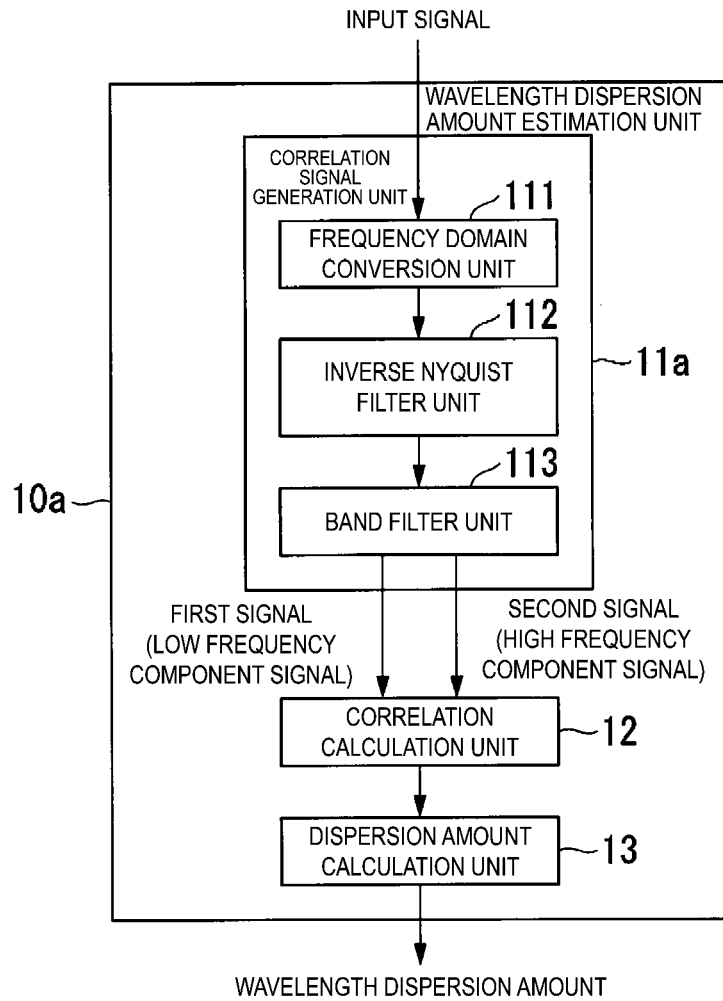
FIG. 12 is a block diagram illustrating another configuration example of the wavelength dispersion amount estimation unit according to the first embodiment.

FIG. 12 is a block diagram illustrating a configuration of a wavelength dispersion amount estimation unit 10a according to another configuration example of the first embodiment. The same components as the wavelength dispersion amount estimation unit 10 illustrated in FIG. 1 are denoted by the same reference signs, and different components will be described below.

The wavelength dispersion amount estimation unit 10a includes a correlation signal generation unit 11a, a correlation calculation unit 12, and a dispersion amount calculation unit 13. The correlation signal generation unit 11a includes a frequency domain conversion unit 111, an inverse Nyquist filter unit 112 (a inverse Nyquist filter), and a band filter unit 113.

The inverse Nyquist filter unit 112 includes a filter having the shape illustrated in FIG. 13(b).

Figure 13:
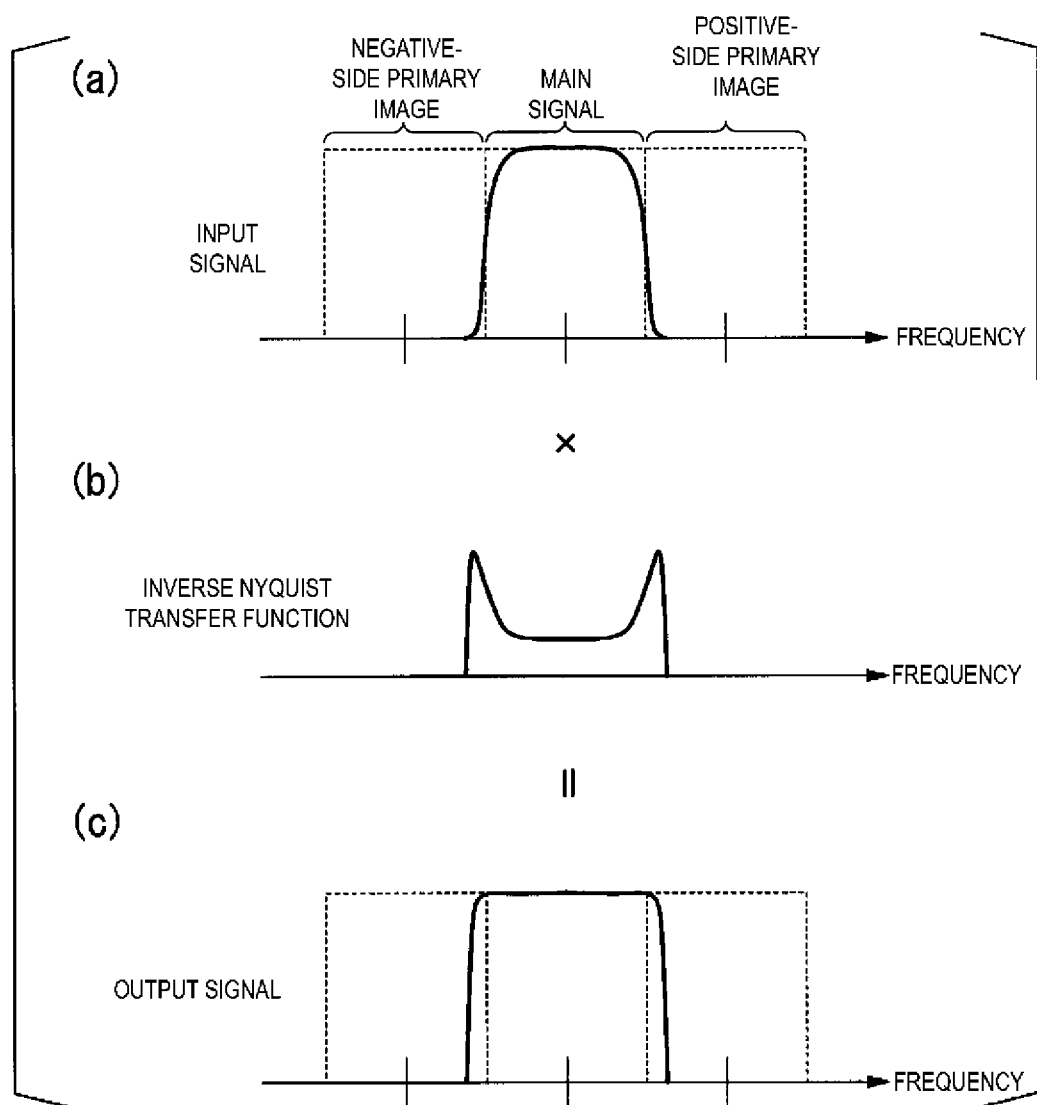
FIG. 13 is a diagram illustrating processing by an inverse Nyquist filter unit according to the first embodiment.

In FIG. 13, the diagram of FIG. 13(a) is a waveform of a Nyquist signal, and the waveform matches the shape of the band pass filter generating a Nyquist signal from an impulse signal.

The filter having the shape illustrated in FIG. 13(b) is a filter having a shape indicated by an inverse Nyquist transfer function having inverse characteristics of a band pass filter that generates a Nyquist signal from an impulse signal. Hereinafter, the filter having the shape illustrated in FIG. 13(b) is referred to as an inverse Nyquist filter. By applying the inverse Nyquist filter, the suppression by the band pass filter generating the Nyquist signal from the impulse signal can be canceled. That is, when the inverse Nyquist filter unit 112 acquires the Nyquist signal illustrated in FIG. 13(a) as an input signal, the inverse Nyquist filter is applied to output an output signal obtained by amplifying the amplitude spectrum of the image signal that has been suppressed, as illustrated in FIG. 13(c), for example.

As a result, the amplitude spectrum of the image signal can be increased, and thus a distinct peak can be obtained by the cross correlation by the correlation calculation unit 12. However, because noise is increased when the amplitude spectrum of the image signal is simply amplified, the shape of the filter of the inverse Nyquist filter unit 112 needs to be predetermined so as to suppress the noise enhancement.

Second Embodiment

Figure 14:
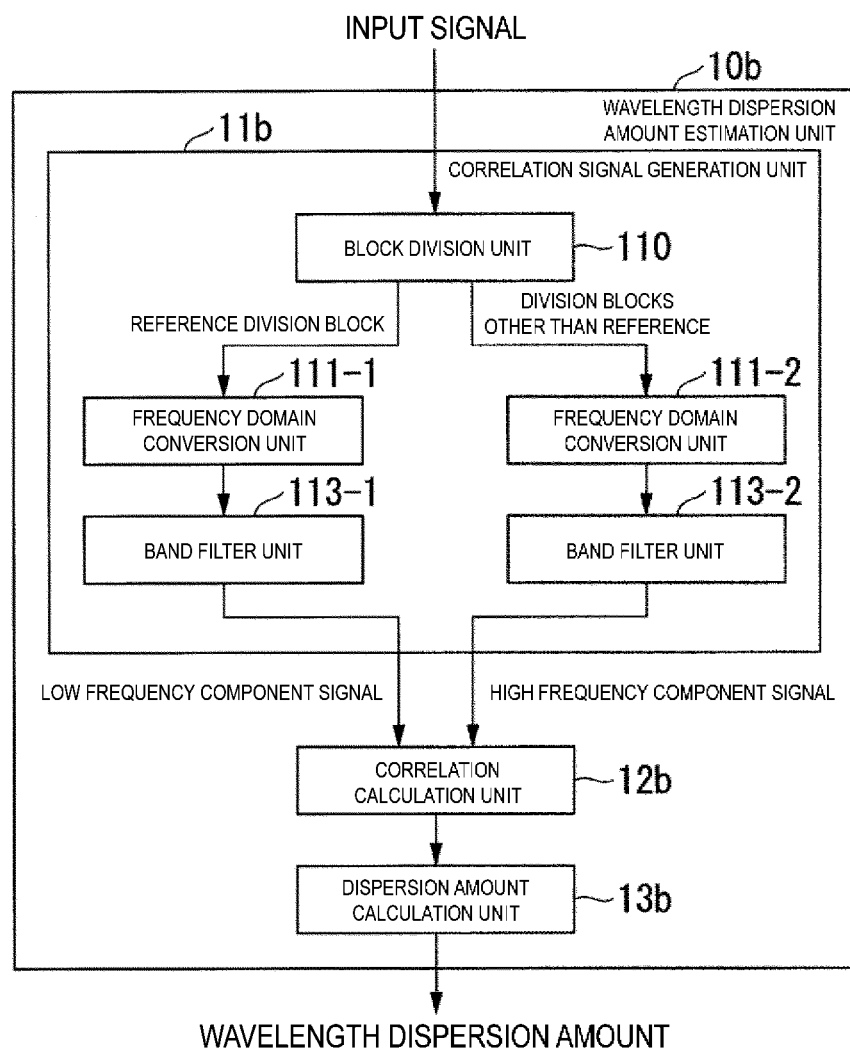
FIG. 14 is a block diagram illustrating a configuration of a wavelength dispersion amount estimation unit according to a second embodiment.

FIG. 14 is a block diagram illustrating a configuration of a wavelength dispersion amount estimation unit 10b according to a second embodiment.

The same components as those according to the first embodiment are denoted by the same reference signs, and different components will be described below.

In the wavelength dispersion amount estimation unit 10 or 10a according to the first embodiment, the band filter unit 113 selects the high frequency band section 130 and the low frequency band section 131 for a single FFT frame, and generates a high frequency component signal and a low frequency component signal. Then, the correlation calculation unit 12 multiplies, for each element, a complex conjugate of either the high frequency component signal or the low frequency component signal with the other signal, and converts the result into the time domain by the IFFT to calculate the cross correlation. In this way, in the calculated cross correlation, a peak appears at a single point, and thus the dispersion amount calculation unit 13 detects the position of this peak and calculates the wavelength dispersion amount.

However, when a peak is present in the k-th element of the time domain frame having the length N, there is a problem (so-called unwrap problem) in that there can be two cases including a case in which the position of +k indicates the wavelength dispersion amount, and a case in which the position of −(N−k) indicates the wavelength dispersion amount. Thus, in a case in which a single FFT frame is used, it is necessary to determine which of the two cases indicates the correct wavelength dispersion amount by using another means. In contrast, in the wavelength dispersion amount estimation unit 10b according to the second embodiment described below, the correct wavelength dispersion amount is calculated from the position of the peak without using another means.

The wavelength dispersion amount estimation unit 10b includes a correlation signal generation unit 11b, a correlation calculation unit 12b, and a dispersion amount calculation unit 13b. The correlation signal generation unit 11b includes a block division unit 110, frequency domain conversion units 111-1 and 111-2, and band filter units 113-1 and 113-2.

Figure 15:
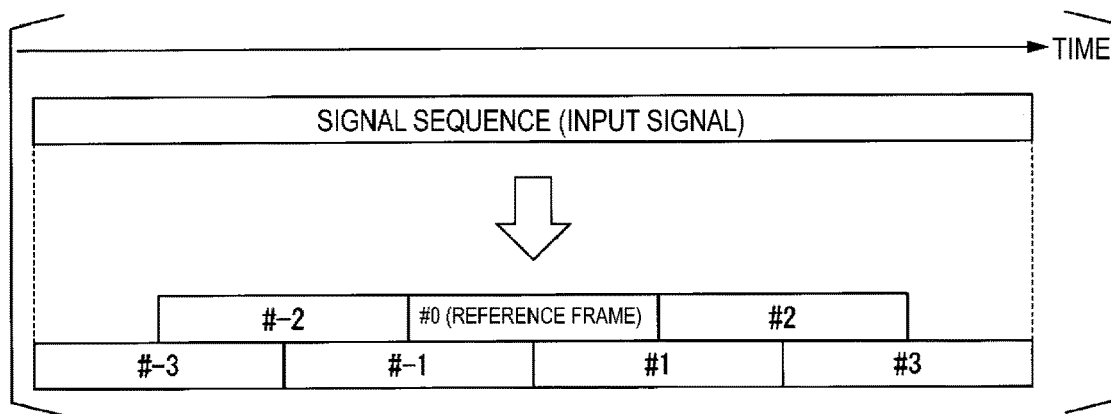
FIG. 15 is a diagram illustrating a configuration of division frames according to the second embodiment.

The block division unit 110 divides the acquired input signal into a plurality of division blocks so that 50% overlap occurs between adjacent blocks, as illustrated in FIG. 15, for example. The length of each of the division frames is the same time length, and in a case in which the length of the FFT frame in the wavelength dispersion amount estimation unit 10 or 10a according to the first embodiment is, for example, 2048, in the second embodiment, the length of one division block is ⅛, that is, 256, for example.

The block division unit 110 selects any one division block as a reference division block from among the plurality of division blocks that have been generated. The block division unit 110 outputs the selected reference division block to the frequency domain conversion unit 111-1, and outputs each of the division blocks other than the reference division block to the frequency domain conversion unit 111-2.

The frequency domain conversion unit 111-1 converts the signal included in the reference division block into a frequency domain. The frequency domain conversion unit 111-2 converts a signal included in each of the division blocks other than the reference division block into a frequency domain.

The band filter unit 113-1 filters the frequency converted signal corresponding to the reference division block in the low frequency band section 131 selected according to the first and second selection conditions described above to generate a low frequency component signal.

The band filter unit 113-2 filters the frequency converted signal corresponding to each of the division blocks other than the reference division block in the high frequency band section 130 selected according to the first and second selection conditions described above to generate a plurality of high frequency component signals.

The correlation calculation unit 12b calculates the cross correlation between the low frequency component signal output by the band filter unit 113-1 and each of the plurality of high frequency component signals output by the band filter unit 113-2. The dispersion amount calculation unit 13b detects the maximum value of the value of the peak from the plurality of cross correlation results output by the correlation calculation unit 12b. The dispersion amount calculation unit 13b calculates the wavelength dispersion amount on the basis of the position of the division frame corresponding to the detected maximum value and the position in which the peak of the maximum value is obtained in the cross correlation.

Processing by Wavelength Dispersion Amount Estimation Unit According to Second Embodiment Next, a flow of the processing of the wavelength dispersion amount estimation unit 10b according to the second embodiment will be described with reference to FIG. 16. Hereinafter, each division block output by the block division unit 110 is represented as division blocks #0, #1, #−1, . . . , as illustrated in FIG. 15.

Figure 16:
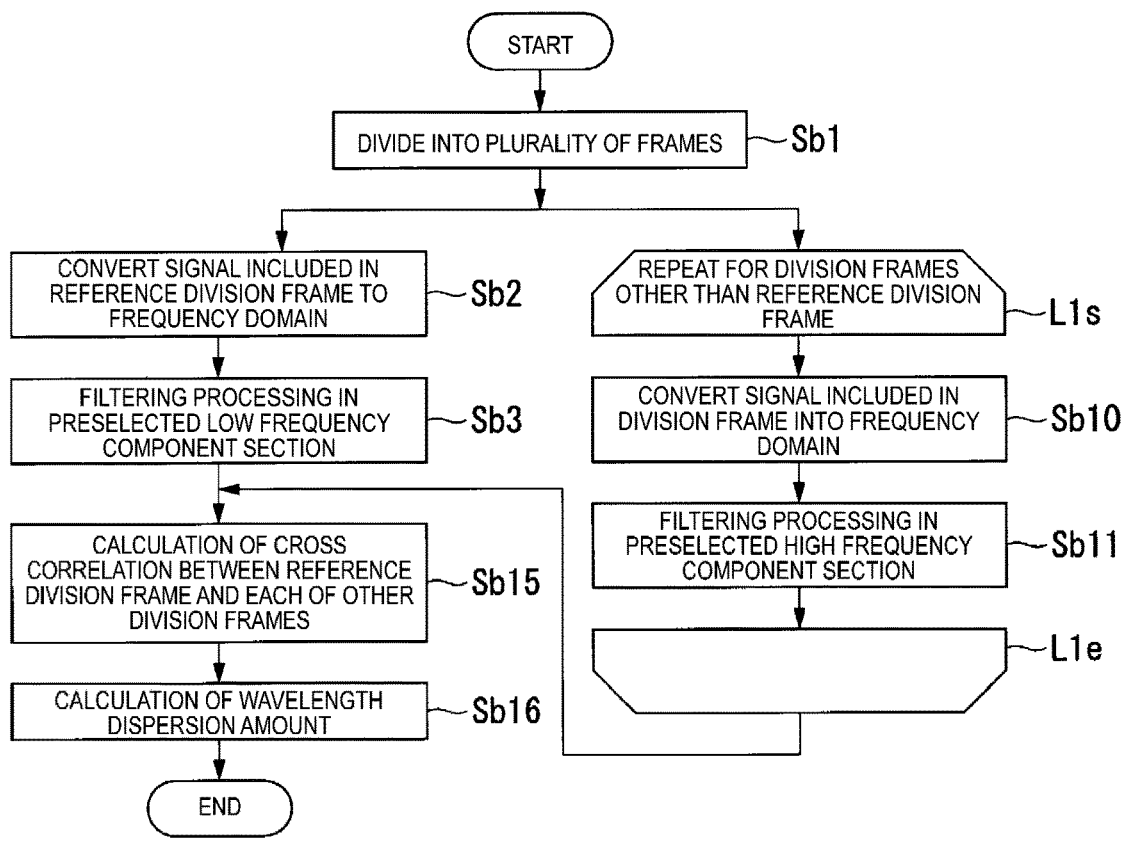
FIG. 16 is a flowchart illustrating a flow of processing of the wavelength dispersion amount estimation unit according to the second embodiment.

Before the processing illustrated in FIG. 16 is initiated, the band filter unit 113-1 selects the low frequency band section 131 in advance, and the band filter unit 113-2 selects the high frequency band section 130 in advance.

The block division unit 110 divides the acquired input signal into a plurality of division blocks #0, #1, #−1, . . . so that 50% overlap occurs between adjacent blocks. The block division unit 110 selects, for example, division block #0 as the reference division block from among division blocks #0, #1, #−1, . . . . The block division unit 110 outputs the reference division block to the frequency domain conversion unit 111-1, and outputs the division blocks #1, #−1, . . . other than the reference division block to the frequency domain conversion unit 111-2 (step Sb1).

The frequency domain conversion unit 111-1 converts the signal included in the reference block into a frequency domain by, for example, the FFT (step Sb2). The band filter unit 113-1 filters the signal converted to the frequency domain corresponding to the reference block in the low frequency band section 131 selected in advance to generate a low frequency component signal. The band filter unit 113-1 outputs the generated low frequency component signal to the correlation calculation unit 12b (step Sb3).

On the other hand, the frequency domain conversion unit 111-2 selects any one of the division blocks #1, #−1, . . . output by the block division unit 110. Here, suppose that the frequency domain conversion unit 111-2 first selects division block #1. The frequency domain conversion unit 111-2 converts the signal included in selected division block #1 into a frequency domain by, for example, the FFT (step Sb10). The band filter unit 113-2 filters the signal converted to the frequency domain corresponding to division block #1 in the high frequency band section 130 selected in advance to generate a high frequency component signal. The band filter unit 113-2 outputs the generated high frequency component signal to the correlation calculation unit 12b (step Sb11). The frequency domain conversion unit 111-2 and the band filter unit 113-2 repeat the processing of step Sb10 and step Sb11 for all the division blocks #1, #−1, . . . (loops L1s to L1e).

The correlation calculation unit 12b calculates the cross correlation between the low frequency component signal output by the band filter unit 113-1 and each of the plurality of high frequency component signals output by the band filter unit 113-2 (step Sb15).

The dispersion amount calculation unit 13b detects a peak value p(n) and a peak position p_loc(n) for each division blocks #1, #–1, . . . from each of the plurality of cross correlation results output by the correlation calculation unit 12b. Here, "n" is a variable representing any one of the numbers, for example, "1", "–1", . . . , excluding the symbol "#" from the sings #1, #–1, . . . assigned to the division blocks.

The dispersion amount calculation unit 13b detects a maximum value from the plurality of peak values p(n). Here, suppose that "n" where the maximum value of the peak value can be obtained is "N". The dispersion amount calculation unit 13b calculates the delay amount T of the high frequency component signal and the low frequency component signal on the basis of following Equation (2).

$$\tau = \text{len} \times N + p\_\text{loc}(N) \quad (2)$$

Note that in Equation (2), "len" is the length of one division frame. The dispersion amount calculation unit 13b substitutes the calculated T into Equation (1) and calculates the wavelength dispersion amount D [ps/nm] (step Sb16).

The configuration according to the second embodiment described above divides the input signal into a plurality of division blocks such that 50% overlap occurs between adjacent blocks. Any one division block is selected from among the divided division blocks as a reference block. A low frequency component signal is generated by filtering from the selected reference division block, and a plurality of high frequency component signals are generated by filtering from each of the division blocks other than the reference division block. A cross correlation between the generated low frequency component signal and each of the plurality of generated high frequency component signals is calculated, a maximum value from among the peak values included in the calculated cross correlations is detected, and the delay amount T of the low frequency component signal and the high frequency component signal is calculated on the basis of the position of the division block corresponding to the maximum value of the detected peak value and the position in the result of the cross correlation of the maximum value of the peak value.

As a result, the delay amount τ can be uniquely calculated from the information indicating two positions: the position of the division block in which the maximum value of the peak value has been obtained and the position of the peak in the cross correlation. However, even with the configuration according to the second embodiment, for example, in the case of the division blocks #3 and #–3 on both ends illustrated in FIG. 15, the unwrap problem remains. However, the delay amount τ can be accurately calculated in many division blocks.

In the configuration according to the second embodiment described above, because a FFT frame that is shorter than the configuration according to the first embodiment is used, there is an effect that the circuit size when hardware is implemented can be reduced.

However, in the configuration according to the second embodiment, because the length of the division block, i.e., the length of the FFT frame is short, the clarity of the peak decreases. However, by performing the acquisition of a signal sequence and calculation of a cross correlation a plurality of times, and averaging the plurality of cross correlations for the same n so that the reduction in the clarity of the peak can be reduced.

Note that, in the configuration according to the second embodiment described above, the band filter unit 113-1 selects the low frequency band section 131, and the band filter unit 113-2 selects the high frequency band section 130. In contrast, conversely the band filter unit 113-1 may select the high frequency band section 130, and the band filter unit 113-2 may select the low frequency band section 131.

In the configuration according to the second embodiment described above, the length of one division block is 256, but the length may be a length other than 256, and ratio of the overlapping region with adjacent division frames may be a ratio other than 50%. A block other than division block #0 may be selected as the reference division block.

Third Embodiment

Figure 17:
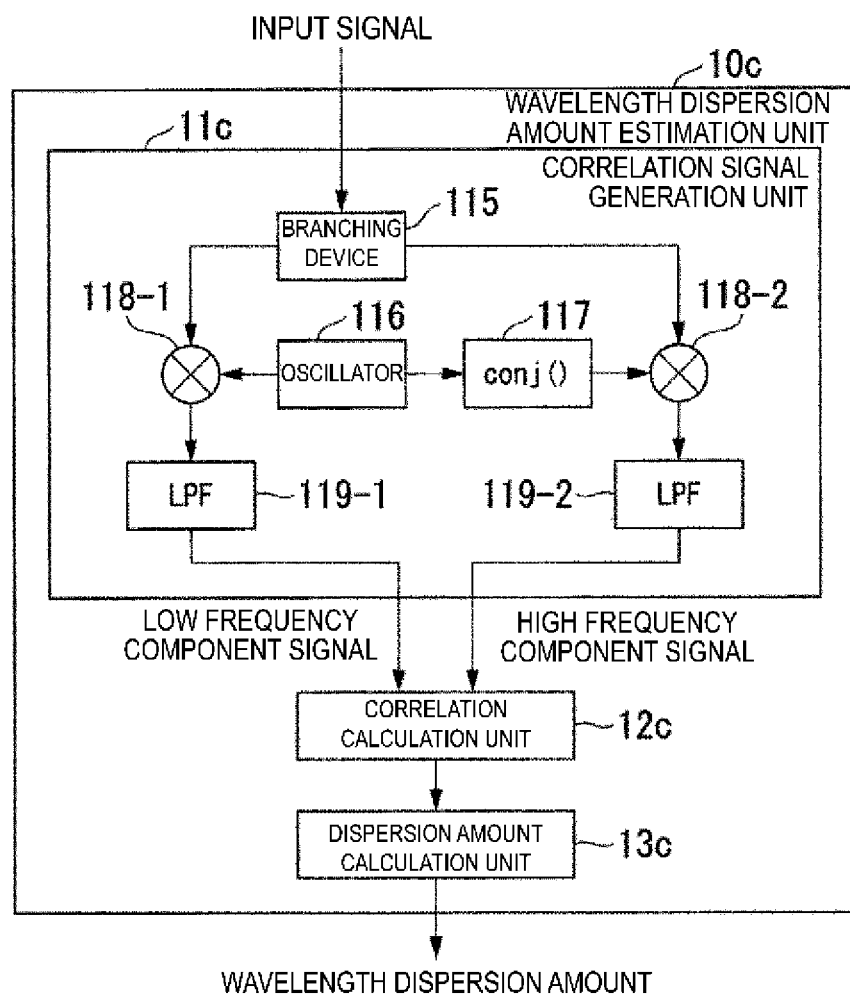
FIG. 17 is a block diagram illustrating a configuration of a wavelength dispersion amount estimation unit according to a third embodiment.

FIG. 17 is a block diagram illustrating a configuration of a wavelength dispersion amount estimation unit 10c according to a third embodiment.

The same components as those according to the first embodiment are denoted by the same reference signs, and different components will be described below. The wavelength dispersion amount estimation unit 10c includes a correlation signal generation unit 11c, a correlation calculation unit 12c, and a dispersion amount calculation unit 13c. The wavelength dispersion amount estimation unit 10, 10a or 10b according to the first and second embodiments generates a signal for cross correlation in the frequency domain. In contrast, the wavelength dispersion amount estimation unit 10c according to the third embodiment generates a signal for cross correlation in the time domain.

The correlation signal generation unit 11c includes a branching device 115 (a splitter), an oscillator 116, a complex conjugate computation unit 117, multipliers 118-1 and 118-2, and low pass filters (LPFs) 119-1 and 119-2.

The branching device 115 acquires the vertically polarized wave of the receive signal as an input signal, and branches the acquired input signal into two to output the two respective signals to the multipliers 118-1 and 118-2. The oscillator 116 is, for example, a numerically controlled oscillator (NCO), and outputs an oscillating signal having an oscillation frequency of one half of a baud rate B of the receive signal.

The complex conjugate computation unit 117 acquires the oscillating signal output by the oscillator 116 and outputs a signal of the complex conjugate of the oscillating signal. In other words, if the oscillator 116 outputs an oscillating signal of a complex number in a positive rotation, for example, the multiplier 118-1 is given an oscillating signal in a positive rotation, and the multiplier 118-2 is given an oscillating signal in a negative rotation.

The multiplier 118-1 multiplies the input signal output by the branching device 115 and the signal output by the oscillator 116 and outputs the result. The multiplier 118-2 multiplies the input signal output by the branching device 115 and the signal of the complex conjugate of the oscillating signal output by the complex conjugate computation unit 117 and outputs the result. The LPFs 119-1 and 119-2 are low pass filters and filter off the high frequency components of the signals output by the multipliers 118-1 and 118-2.

Figure 18:
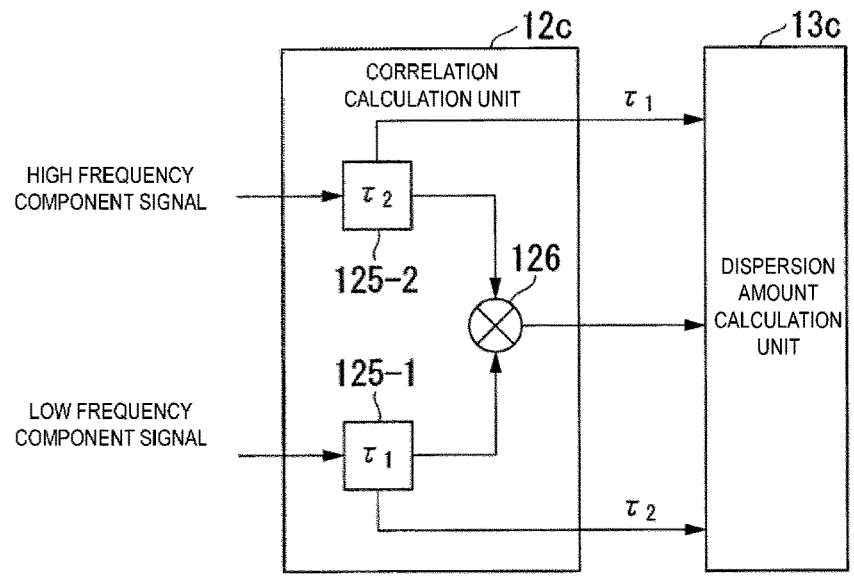
FIG. 18 is a block diagram illustrating an internal configuration of a correlation calculation unit according to the third embodiment, and is a diagram illustrating a connection configuration of the correlation calculation unit and the dispersion amount calculation unit.

The correlation calculation unit 12c performs a convolutional operation between the signal output by the LPF 119-1 and the signal output by the LPF 119-2, and calculates the cross correlation. The correlation calculation unit 12c includes delay devices 125-1 and 125-2 and a multiplier 126, for example, as illustrated in FIG. 18.

The delay device 125-1 is connected to the LPF 119-1, and delays the signal output by the LPF 119-1 for a time period of the delay time $\tau_1$ to output the signal according to the multiplier 126. The delay device 125-2 is connected to the LPF 119-2, and delays the signal output by the LPF 119-2 for a time period of the delay time $\tau_2$ to output the signal according to the multiplier 126. Each of the delay devices 125-1 and 125-2 configures the delay time $\tau_1$ or $\tau_2$ to switch to any delay time, and outputs the configured delay time $\tau_1$ or $\tau_2$ to the dispersion amount calculation unit 13c.

The multiplier 126 multiplies the signal output by the delay device 125-1 and the signal output by the delay device 125-2, and outputs the product, that is, the cross correlation value, calculated by the multiplication, to the dispersion amount calculation unit 13c.

The dispersion amount calculation unit 13c detects a peak from among the cross correlation values output in sequence by the multiplier 126 of the correlation calculation unit 12c, and calculates the delay amount $\tau$ from the delay times $\tau_1$ and $\tau_2$ corresponding to the detected peaks by the following Equation (3).

$$\tau = \tau_1 - \tau_2 \quad (3)$$

The dispersion amount calculation unit 13c substitutes the delay amount $\tau$ calculated by Equation (3) into Equation (1) and calculates the wavelength dispersion amount D.

Figure 19:
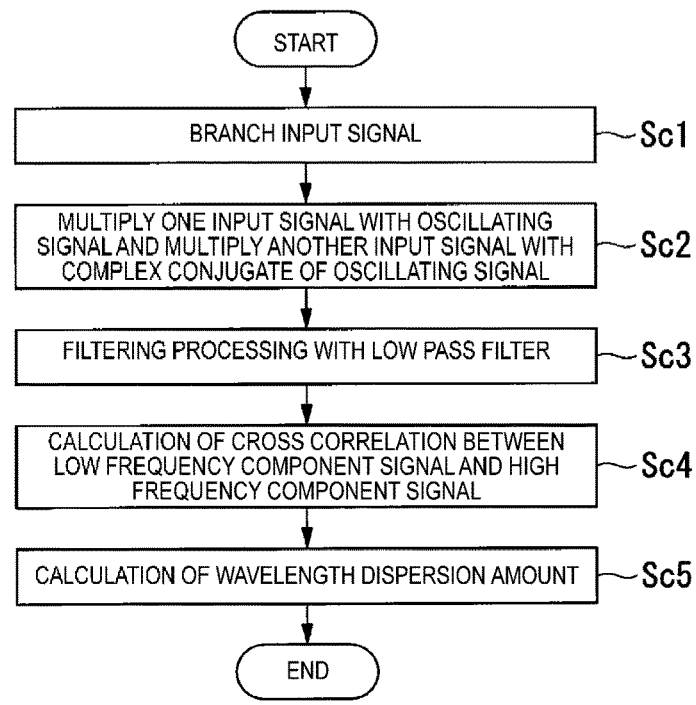
FIG. 19 is a flowchart illustrating a flow of processing of the wavelength dispersion amount estimation unit according to the third embodiment.

Processing by Wavelength Dispersion Amount Estimation Unit According to Third Embodiment Next, a flow of the processing of the wavelength dispersion amount estimation unit 10c according to the third embodiment will be described with reference to FIG. 19. The branching device 115 of the correlation signal generation unit 11c acquires the vertically polarized wave of the receive signal as an input signal, and branches the acquired input signal into two to output the two respective signals to the multipliers 118-1 and 118-2 (step Sc1).

The multiplier 118-1 multiplies one input signal output by the branching device 115 and the oscillating signal at the oscillation frequency of one half of the baud rate B of the input signal output by the oscillator 116 and outputs the result. The multiplier 118-2 multiplies the other input signal output by the branching device 115 and the signal of the complex conjugate of the oscillating signal at the oscillation frequency of ½ of the baud rate B of the input signal output by the complex conjugate computation unit 117 and outputs the result (step Sc2). That is, the multipliers 118-1 and 118-2 mix the input signals with the oscillating signal at the oscillation frequency of one half of the baud rate B of the input signal, where the multiplier 118-1 outputs an input signal with an increased frequency by 1/2B, and the multiplier 118-2 outputs an input signal with a decreased frequency by 1/2B.

The LPFs 119-1 and 119-2 filter off the high frequency components of the signal output by the multipliers 118-1 and 118-2 (step Sc3). The LPF 119-1 outputs a low frequency component signal with an increased frequency by 1/2B from the input signal to remove high frequency components in the positive frequency domain of the input signal with the increased frequency by 1/2B. In contrast, the LPF 119-2 outputs a high frequency component signal with a decreased frequency by 1/2B from the input signal to remove high frequency components in the negative frequency domain of the input signal with the decreased frequency by 1/2B. Thus, the frequency difference between the low frequency component signal and the high frequency component signal is B, which is equal to the baud rate.

The correlation calculation unit 12c performs a convolutional operation between the low frequency component signal output by the LPF 119-1 and the high frequency component signal output by the LPF 119-2, and calculates the cross correlation between the low frequency component signal and the high frequency component signal (step Sc4). Specifically, in the correlation calculation unit 12c, the delay device 125-1 provides the delay of the delay time $\tau_1$, which is configured by being optionally switched, to the low frequency component signal output by the LPF 119-1, and outputs the result to the multiplier 126. When the delay device 125-1 configures the new delay time Ti, the delay device 125-1 outputs the configured delay time $\tau_1$ to the dispersion amount calculation unit 13c.

The delay device 125-2 provides the delay of the delay time $\tau_2$, which is configured by being optionally switched, to the high frequency component signal output by the LPF 119-2, and outputs the result to the multiplier 126. When the delay device 125-2 configures the new delay time $\tau_2$, the delay device 125-2 outputs the configured delay time $\tau_2$ to the dispersion amount calculation unit 13c.

Note that, in the correlation calculation unit 12c, the reason for providing a delay time to each of the low frequency component signal and the high frequency component signal by using the two delay devices 125-1 and 125-2 instead of one is because both the positive wavelength dispersion and the negative wavelength dispersion can be detected.

The multiplier 126 multiplies the two signals output by the delay devices 125-1 and 125-2, and outputs the product, that is, the cross correlation value, calculated by the multiplication, to the dispersion amount calculation unit 13c. The dispersion amount calculation unit 13c detects a peak from among the cross correlation values output in sequence by the multiplier 126 of the correlation calculation unit 12c, and calculates the delay amount $\tau$ from the delay times $\tau_1$ and $\tau_2$ corresponding to the detected peaks by the Equation (3). The dispersion amount calculation unit 13c substitutes the delay amount $\tau$ calculated by Equation (3) into Equation (1) and calculates the wavelength dispersion amount D (step Sc5).

In the configuration according to the third embodiment described above, the branching device 115 of the correlation signal generation unit 11c acquires the receive signal as an input signal and branches the acquired input signal into two. The oscillator 116 outputs an oscillating signal at an oscillation frequency of one half of a baud rate of the input signal. The multiplier 118-1 multiplies one of the input signals obtained through the branching by the branching device 115 and the oscillating signal output by the oscillator 116, to generate and output a first signal. The multiplier 118-2 multiplies one of the input signals obtained through the branching by the branching device 115 and the complex conjugate of the oscillating signal output by the oscillator 116, to generate and output a second signal. The correlation calculation unit 12c calculates the cross correlation between the first signal and the second signal. The dispersion amount calculation unit 13c calculates the wavelength dispersion amount on the basis of the position of the peak of the cross correlation.

As a result, the position of the peak in the result of the cross correlation indicates the delay amount caused by the wavelength dispersion, and it is possible to calculate the wavelength dispersion amount from the position of the peak. Similar to the configuration according to the first and second embodiments, the configuration according to the third embodiment is a scheme referred to as a blind scheme, which allows the wavelength dispersion amount to be calculated without using a training signal. The scheme is not a parameter scanning scheme that requires a long time to sweep a dispersion compensation amount to detect a wavelength dispersion amount. Thus, the wavelength dispersion amount can be calculated in a little computation time without using a characteristic training signal.

Note that in the configuration according to the third embodiment described above, each of the delay devices 125-1 and 125-2 is configured to optionally switch and configure the delay times $\tau_1$ and $\tau_2$, but different delay times $\tau_1$ and $\tau_2$ may be sequentially provided from outside in accordance with a parameter scanning procedure that is predetermined. For example, as the parameter scanning procedure, a procedure may be performed in which a delay time $\tau_1$ is fixed to a constant value, a delay time $\tau_2$ is increased from a minimum value to a maximum value continuously, and when the delay time $\tau_2$ reaches the maximum value, the delay time $\tau_1$ is increased, and increasing the delay time $\tau_2$ from the minimum value to the maximum value is repeated.

Figure 20:
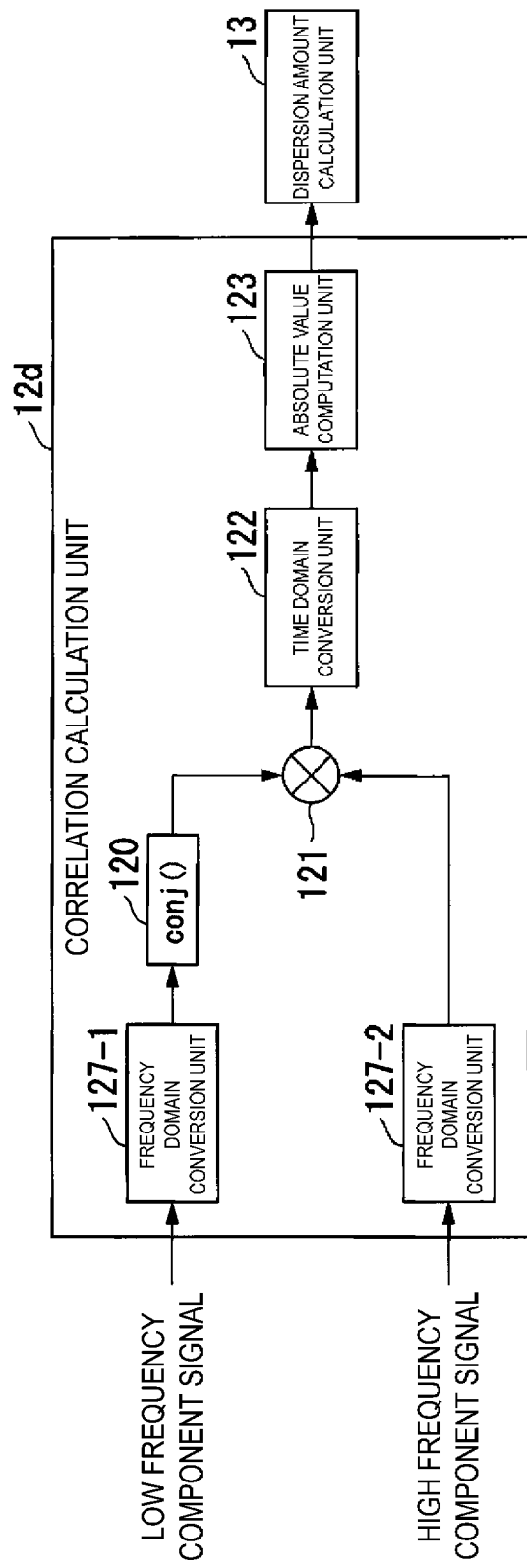
FIG. 20 is a block diagram illustrating an internal configuration of a correlation calculation unit according to the third embodiment.

In the configuration according to the third embodiment described above, the correlation calculation unit 12c is configured to calculate the cross correlation in the time domain, but instead of the correlation calculation unit 12c and the dispersion amount calculation unit 13c, for example, the correlation calculation unit 12d illustrated in FIG. 20 and the dispersion amount calculation unit 13 according to the first embodiment may be applied.

The correlation calculation unit 12d is a configuration in which frequency domain conversion units 127-1 and 127-2 are added to the configuration of the correlation calculation unit 12 according to the first embodiment illustrated in FIG. 8. In the correlation calculation unit 12 according to the first embodiment, the low frequency component signal and the high frequency component signal output by the correlation signal generation unit 11 are already signals in the frequency domain.

In contrast, the low frequency component signal and the high frequency component signal output by the correlation signal generation unit 11c according to the third embodiment are signals in the time domain. Thus, in the correlation calculation unit 12d, the frequency domain conversion units 127-1 and 127-2 convert the low frequency component signal and the high frequency component signal output by the LPFs 119-1 and 119-2 to the frequency domain by, for example, the FFT. In this way, the correlation calculation unit 12d calculates the convolutional operation, that is, the cross correlation, in the frequency domain similar to the correlation calculation unit 12 according to the first embodiment. Similar to the first embodiment, the dispersion amount calculation unit 13 calculates the wavelength dispersion amount D from the result of the cross correlation output by the correlation calculation unit 12d.

In the configuration according to the third embodiment described above, the correlation signal generation unit 11c includes the LPFs 119-1 and 119-2, but the effect obtained by the removal of the high frequency domain by the LPFs 119-1 and 119-2 is the same effect as the effect of reducing noise in the case of the Nyquist signal described with reference to FIG. 11 in the first embodiment. Thus, in the case of an RZ signal or an NRZ signal that is resistant to noise, the LPFs 119-1 and 119-2 may not be provided.

Fourth Embodiment

Next, wavelength dispersion amount estimation units 10e and 10f according to the fourth embodiment will be described with reference to FIGS. 21 to 25. The wavelength dispersion amount estimation unit 10, 10a, 10b, or 10c according to the first to third embodiments generates two signals so that the frequency difference between the two signals used for the cross correlation is a baud rate B, with the assumption that the baud rate B is known in advance. In contrast, in a case in which the baud rate B is unknown, the wavelength dispersion amount estimation units 10e and 10f according to the fourth embodiment include a baud rate estimation processing unit 15 (a baud rate estimation processor) that estimates a baud rate from the receive signal.

Figure 21:
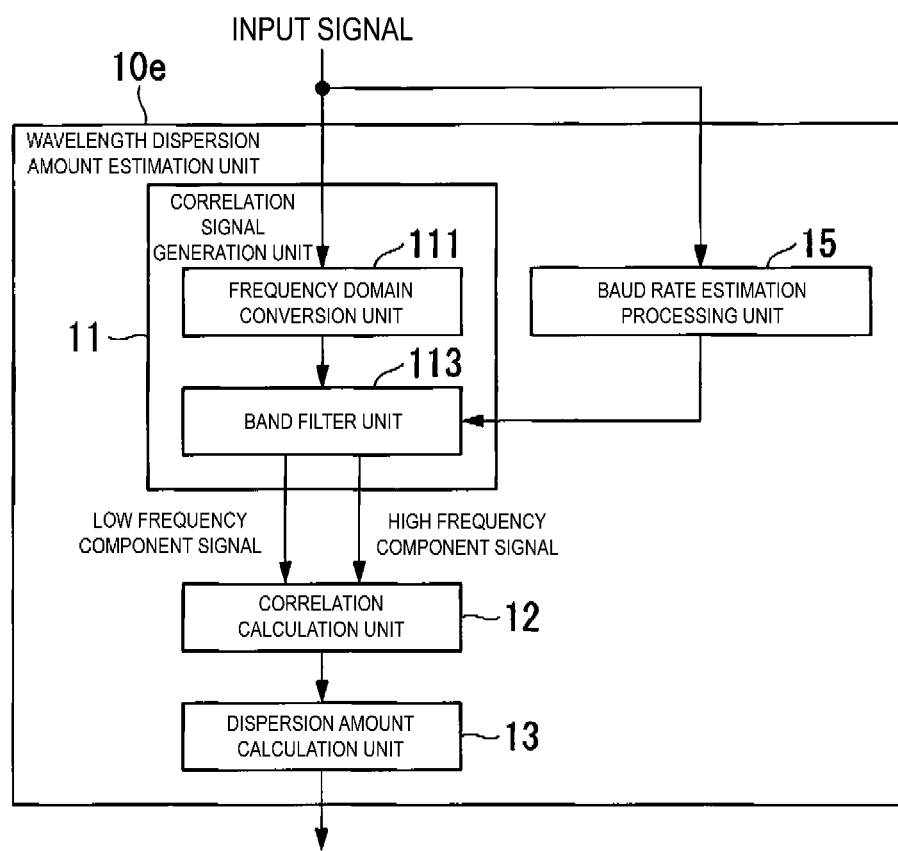
FIG. 21 is a block diagram (No. 1) illustrating a configuration of a wavelength dispersion amount estimation unit according to a fourth embodiment.
Figure 22:
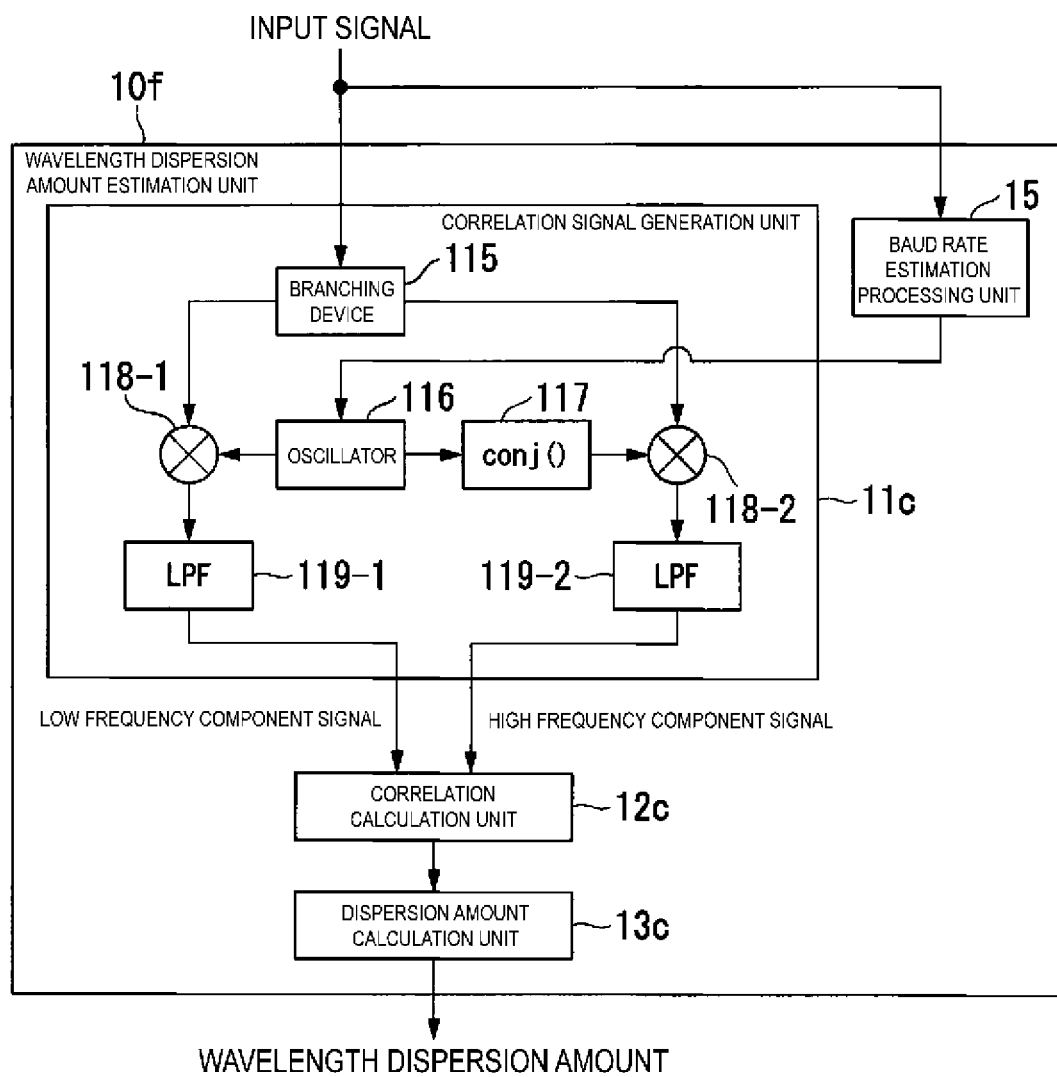
FIG. 22 is a block diagram (No. 2) illustrating a configuration of the wavelength dispersion amount estimation unit according to the fourth embodiment.

FIG. 21 is a block diagram illustrating a configuration of the wavelength dispersion amount estimation unit 10e in which the wavelength dispersion amount estimation unit 10 according to the first embodiment includes the baud rate estimation processing unit 15, for example. In the case of the wavelength dispersion amount estimation unit 10e in FIG. 21, the band filter unit 113 acquires the baud rate estimated by the baud rate estimation processing unit 15 and utilizes the value of the estimated baud rate as the value of the frequency difference of the leading positions of the two sections. FIG. 22 is a block diagram illustrating a configuration of the wavelength dispersion amount estimation unit 10f in which the wavelength dispersion amount estimation unit 10c according to the third embodiment includes the baud rate estimation processing unit 15, for example. In the case of the wavelength dispersion amount estimation unit 10f of FIG. 22, the oscillator 116 acquires the baud rate estimated by the baud rate estimation processing unit 15 and utilizes the value of half of the acquired baud rate as the oscillation frequency. Note that the same components as those according to the first to third embodiments are denoted by the same reference signs.

Figure 23:
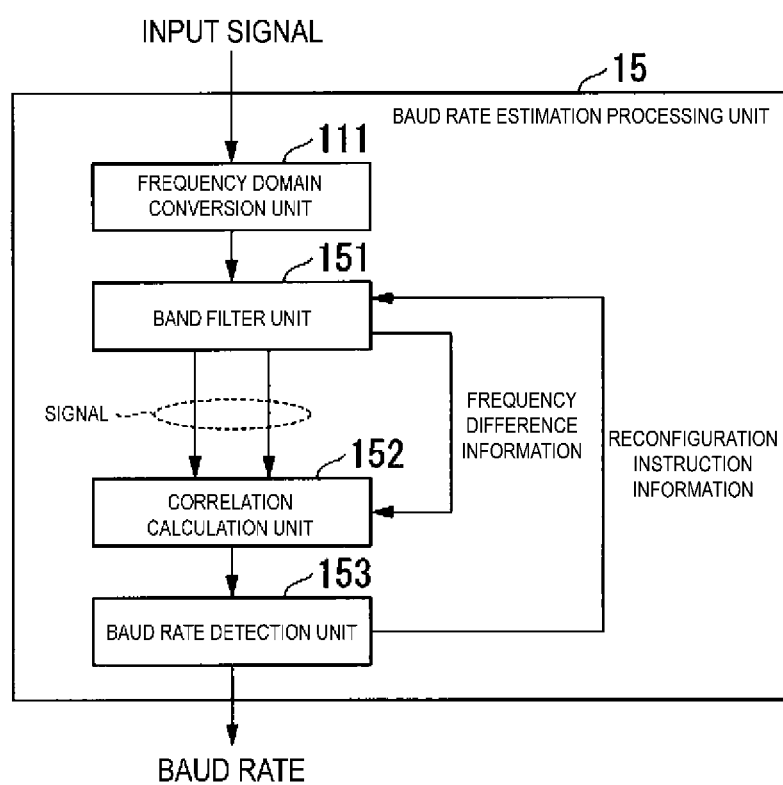
FIG. 23 is a block diagram illustrating an internal configuration of a baud rate estimation processing unit according to the fourth embodiment.

FIG. 23 is a block diagram illustrating a configuration of the baud rate estimation processing unit 15. In the wavelength dispersion amount estimation unit 10 according to the first embodiment, the band filter unit 113 fixedly selects sections of the high frequency band section 130 and the low frequency band section 131 so that the leading positions are separated each other by the baud rate B.

In contrast, the baud rate estimation processing unit 15 is configured to optionally select a section of the frequency.

The baud rate estimation processing unit 15 includes the frequency domain conversion unit 111, a band filter unit 151, a correlation calculation unit 152 (a correlation calculator), and a baud rate detection unit 153 (a baud rate detector). The band filter unit 151 optionally selects two sections in the frequency domain.

The band filter unit 151 filters the input signal converted to the frequency domain by the frequency domain conversion unit 111 in the two selected sections to generate two correlation signals. The band filter unit 151 outputs frequency difference information indicating the difference in the leading positions of the two selected sections to the correlation calculation unit 152.

The correlation calculation unit 152 calculates the cross correlation of the two correlation signals output by the band filter unit 151. The correlation calculation unit 152 may calculate the cross correlation in the frequency domain, such as the correlation calculation unit 12 according to the first embodiment, or may calculate the cross correlation in the time domain, such as the correlation calculation unit 12c according to the third embodiment. Note that in a case of calculating the cross correlation in the time domain, the two correlation signals must be converted to the time domain, e.g., by IFFT. The correlation calculation unit 152 outputs the calculated cross correlation results and the frequency difference information to the baud rate detection unit 153.

In a case in which a peak is included in the result of the cross correlation calculated by the correlation calculation unit 152, the baud rate detection unit 153 outputs the frequency difference information received from the correlation calculation unit 152 as a baud rate.

Figure 24:
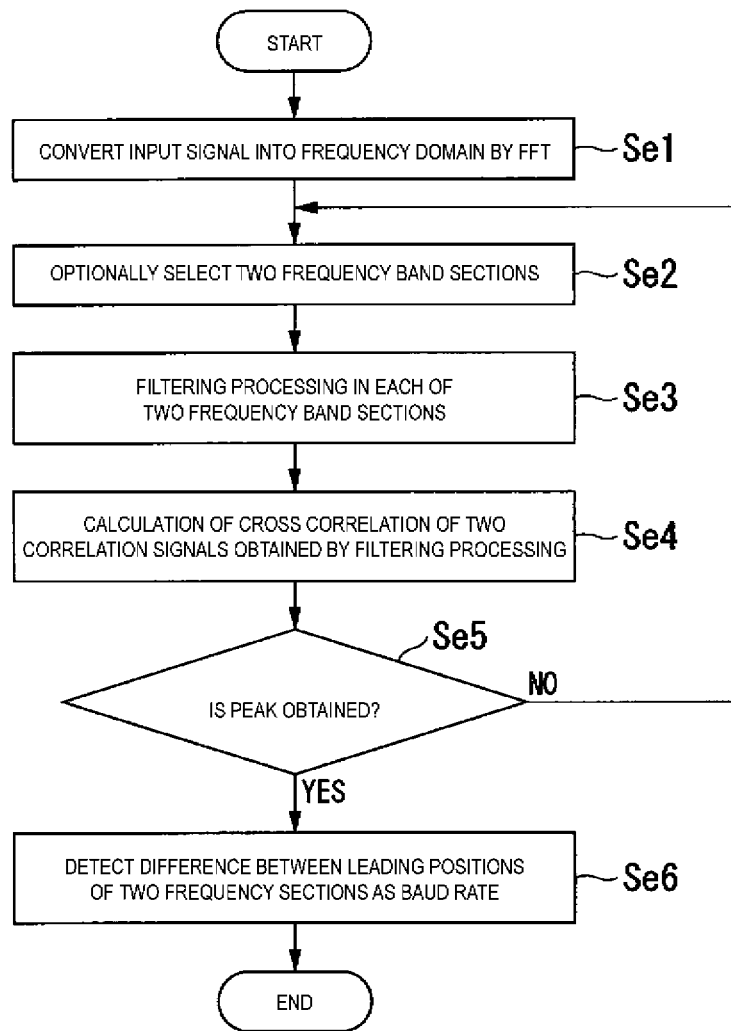
FIG. 24 is a flowchart illustrating a flow of processing of calculating a baud rate according to the fourth embodiment.

Processing by Baud Rate Estimation Processing Unit Included in Wavelength Dispersion Amount Estimation Unit According to Fourth Embodiment Next, a flow of the processing by the baud rate estimation processing unit 15 will be described with reference to FIG. 24. When the frequency domain conversion unit 111 of the baud rate estimation processing unit 15 acquires the vertically polarized wave of the receive signal as an input signal, the frequency domain conversion unit 111 converts the acquired input signal into a frequency domain by the FFT (step Se1). The frequency domain conversion unit 111 outputs the input signal converted to the frequency domain to the band filter unit 151.

The band filter unit 151 selects two sections in the frequency domain (step Se2). The band filter unit 151 filters the input signal converted to the frequency domain by the frequency domain conversion unit 111 in the two selected sections to generate two correlation signals (step Se3). The band filter unit 151 outputs two correlation signals and the frequency difference information which is the difference in the leading positions of the two selected sections to the correlation calculation unit 152.

The correlation calculation unit 152 calculates the cross correlation of the two correlation signals output by the band filter unit 151 (step Se4). The correlation calculation unit 152 outputs the calculated cross correlation results and the frequency difference information received from the band filter unit 151 to the baud rate detection unit 153.

The baud rate detection unit 153 determines whether a peak is included in the result of the cross correlation (step Se5). In a case in which the baud rate detection unit 153 determines that the result of the cross correlation does not include a peak (step Se5, No), the baud rate detection unit 153 outputs reconfiguration instruction information to the band filter unit 151. When the band filter unit 151 receives the reconfiguration instruction information, the band filter unit 151 performs processing in steps Se2, and selects two new sections.

On the other hand, in a case in which the baud rate detection unit 153 determines that the result of the cross correlation include a peak (step Se5, Yes), the baud rate detection unit 153 outputs the frequency difference information received from the correlation calculation unit 152 to the band filter unit 113 and the oscillator 116 as a baud rate (step Se6).

According to the configuration according to the fourth embodiment described above, even if the baud rate of the receive signal is unknown, the baud rate can be detected from the receive signal by utilizing the fact that the interval of the main signal of the receive signal and the image signal is equal to the baud rate. As illustrated in FIG. 23, the baud rate estimation processing unit 15 performs the processing that repeats reconfiguration of the two sections in the frequency domain, i.e., processing of one-dimensional parameter scanning. This processing is processing performed before the processing for calculating the wavelength dispersion amount.

Note that, in the configuration according to the fourth embodiment described above, the band filter unit 151 optionally selects two sections, and may be configured so as to optionally select both of the two sections, or may be configured so that one section is configured to be fixed so as to include the main signal or the image signal while the other section is optionally selected.

Figure 25:
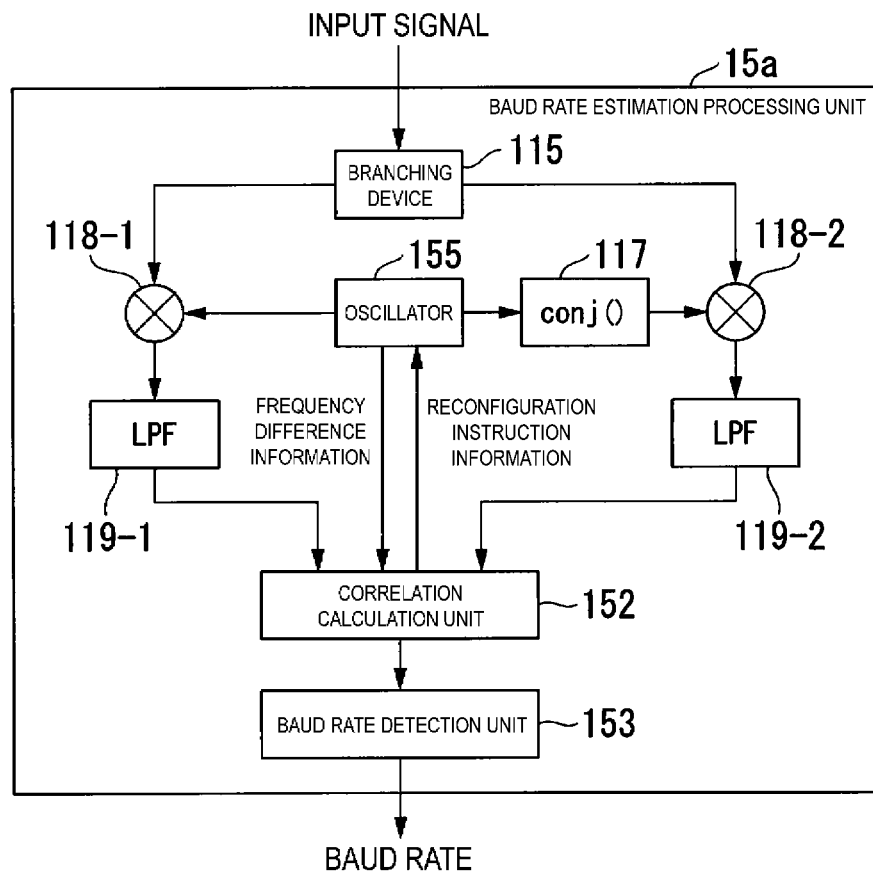
FIG. 25 is a block diagram illustrating another internal configuration of a baud rate estimation processing unit according to the fourth embodiment.

In the configuration according to the fourth embodiment described above, instead of the baud rate estimation processing unit 15, the baud rate estimation processing unit 15a illustrated in FIG. 25 may be included. The baud rate estimation processing unit 15a includes the branching device 115, the complex conjugate computation unit 117, the multipliers 118-1 and 118-2, the LPFs 119-1 and 119-2, an oscillator 155, the correlation calculation unit 152, and the baud rate detection unit 153.

The oscillator 155 configures the oscillation frequency to any value and outputs the oscillating signal. The oscillator 155 outputs a value twice the configured oscillation frequency as the frequency difference information to the correlation calculation unit 152.

In other words, in the baud rate estimation processing unit 15a, the multipliers 118-1 and 118-2 mix the input signals and the oscillating signal at the oscillation frequency optionally configured by the oscillator 155. The multiplier 118-1 outputs an input signal having a frequency increased by half frequency of the oscillation frequency, and the multiplier 118-2 outputs an input signal having a frequency decreased by half frequency of the oscillation frequency.

The correlation calculation unit 152 calculates the cross correlation of the two correlation signals output by each of the LPFs 119-1 and 119-2. The correlation calculation unit 152 outputs the calculated cross correlation results and the frequency difference information received from the oscillator 155 to the baud rate detection unit 153.

The baud rate detection unit 153 determines whether a peak is included in the result of the cross correlation. In a case in which the baud rate detection unit 153 determines that the result of the cross correlation does not include a peak, the baud rate detection unit 153 outputs the reconfiguration instruction information to the oscillator 155. When the oscillator 155 receives the reconfiguration instruction information, the oscillator 155 configures a new oscillation frequency and outputs an oscillating signal, and outputs a value twice the configured oscillation frequency as frequency difference information to the correlation calculation unit 152. On the other hand, in a case in which the baud rate detection unit 153 determines that a peak is included in the result of the cross correlation, the baud rate detection unit 153 outputs the frequency difference information received from the correlation calculation unit 152 as a baud rate.

In the case of the baud rate estimation processing unit 15 illustrated in FIG. 23, the two sections in the frequency domain selected by the band filter unit 151 depend on the size of the FFT frame. Thus, in a case in which the baud rate and sampling rate are not in a simple integer ratio, a peak may not be obtained even if any section is chosen. In contrast, because the baud rate estimation processing unit 15a illustrated in FIG. 25 can configure the oscillation frequency to any value in continuous values, the frequency difference at which a peak can be obtained can be identified.

Note that the wavelength dispersion amount estimation unit 10a, which is another configuration example of the first embodiment, and the wavelength dispersion amount estimation unit 10b according to the second embodiment may include the baud rate estimation processing unit 15 or 15a therein.

As described above, in the first to fourth embodiments, the input signal is the receive signal of the vertically polarized wave. However, the receive signal of the horizontally polarized wave may be an input signal. Two of the wavelength dispersion amount estimation units 10, 10a, 10b, 10c, 10e, and 10f may be provided, one of which calculates the wavelength dispersion amount from the receive signal of the horizontally polarized wave, and the other calculates the wavelength dispersion amount from the receive signal of the vertical component.

In the configuration of the first and third embodiments described above, as illustrated in FIGS. 8 and 20, the complex conjugate computation unit 120 is provided on the low frequency component signal side, but may be provided on the high frequency component signal side. In a case in which the complex conjugate computation unit 120 is provided on the low frequency component signal side, the delay of the high frequency component signal is detected on the basis of the low frequency component signal, and in a case in which the complex conjugate computation unit 120 is provided on the high frequency component signal side, the delay of the low frequency component signal is detected on the basis of the high frequency component signal.

In the configuration of the first to third embodiments described above, in the case of a Nyquist signal, the smaller the roll off coefficient is, that is, the steeper the transition is, the smaller the portion of the image signal is.

As a result, the overlapping portions of the two correlation signals are reduced, so a peak is not able to be obtained, and it becomes difficult to calculate the wavelength dispersion amount. The roll off coefficient that can be applied in the configuration of the first to third embodiments is approximately 0.1 degrees or greater, which is a Nyquist signal.

In a case in which the roll off coefficient is zero, i.e., in a case of a perfect rectangular filter, the wavelength dispersion amount cannot be calculated. In the configuration of the first to third embodiments, the wavelength dispersion amount cannot be calculated for a fully Nyquist signal with a zero roll off coefficient or a faster than Nyquist (FTN) signal, that is, a narrowing signal having the signal bandwidth up to or below the baud rate. In such a case, there is a means for inserting a signal having a lower speed than the main signal as a training signal. For example, the wavelength dispersion amount can be calculated by time division multiplexing a signal of the RZ waveform of a ½ baud rate of the main signal with respect to the main signal and applying the configuration according to the first to third embodiments to the portion of the signal of the RZ waveform. The baud rate can also be calculated by applying the configuration according to the fourth embodiment to the portion of the signal of the RZ waveform.

The wavelength dispersion amount estimation unit 10, 10a, 10b, 10c, 10e, or 10f according to the embodiments described above may be provided on the outside of the optical reception device 1 as a wavelength dispersion amount estimation device and connected to the optical reception device 1. The wavelength dispersion amount estimation device may be implemented by a computer. In such a case, it may be implemented by recording a program for implementing these functions in a computer-readable recording medium, causing a computer system to read the program recorded in the recording medium, and executing the program. Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system. Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is a volatile memory inside a computer system that functions as a server or a client in the above-described case. The above program may be a program for implementing a part of the above-mentioned functions. The above program may be a program capable of implementing the above-mentioned functions in combination with another program already recorded in a computer system. The above program may be a program to be implemented with the use of a programmable logic device such as a field programmable gate array (FPGA).

The embodiments of the present invention have been described above in detail with reference to the drawings. However, specific configurations are not limited to those embodiments, and include any design or the like within the scope not departing from the gist of the present invention.

REFERENCE SIGNS LIST

1 Optical reception device
10 Wavelength dispersion amount estimation unit
11 Correlation signal generation unit
12 Correlation calculation unit
13 Dispersion amount calculation unit
20 LO laser
21 Coherent photoelectric converter
22-1 to 22-4 ADC
23-1, 23-2 Complex computation unit
111 Frequency domain conversion unit
113 Band filter unit

The invention claimed is:

1. A wavelength dispersion amount estimation apparatus comprising:
  a correlation signal generator configured to generate, from a receive signal, a first signal including a main signal of the receive signal and at least one second signal with a shift by a baud rate of the receive signal relative to the first signal in a frequency domain, the at least one second signal including an image signal corresponding to the main signal;
  a correlation calculator configured to calculate a cross correlation of the first signal and the at least one second signal; and
  a dispersion amount calculator configured to calculate a wavelength dispersion amount, based on a position of a peak of the cross correlation,
    wherein each of the correlation signal generator, the correlation calculator and the dispersion amount calculator is implemented by:
    i) computer executable instructions executed by at least one processor,
    ii) at least one circuity or
    iii) a combination of computer executable instructions executed by at least one processor and at least one circuity.

2. The wavelength dispersion amount estimation apparatus according to claim 1,
  wherein the correlation signal generator includes
  a frequency domain converter configured to convert the receive signal into a frequency domain and output a frequency domain receive signal and a band filter configured to define a first section including the main signal of the receive signal in the frequency domain and a second section including a leading position at a position separated by the baud rate of the receive signal from a leading position of the first section, the second section including the image signal corresponding to the main signal included in the first section, filter the frequency domain receive signal in the first section to generate the first signal, and filter the frequency domain receive signal in the second section to generate the at least one second signal, wherein the frequency domain converter is implemented by:
i) computer executable instructions executed by at least one processor,
ii) at least one circuity or
iii) a combination of computer executable instructions executed by at least one processor and at least one circuity.

3. The wavelength dispersion amount estimation apparatus according to claim 2,
wherein the receive signal is a Nyquist signal, and
the band filter filters such that each of the first signal and the at least one second signal is signal corresponding to an entire section or a portion of a section where an amplitude spectrum in a frequency domain of the Nyquist signal is increasing or decreasing.

4. The wavelength dispersion amount estimation apparatus according to claim 2,
wherein the receive signal is a Nyquist signal,
the correlation signal generator includes an inverse Nyquist filter configured to apply an inverse Nyquist filter to the frequency domain receive signal, and
the band filter filters the frequency domain receive signal filtered by the inverse Nyquist filter in each of the first section and the second section to generate the first signal and the at least one second signal.

5. The wavelength dispersion amount estimation apparatus according to claim 2,
wherein the frequency domain converter divides the receive signal into frames having a predetermined frame length and performs discrete Fourier transform on the receive signal for each of the frames that are divided to convert the receive signal into a frequency domain, or divides the receive signal into division frames having a frame length shorter than the predetermined frame length, the division frames partially overlapping each other, and performs the discrete Fourier transform on the receive signal for each of the division frames that are divided to convert the receive signal into a frequency domain, and
when the receive signal is divided into the division frames,
the band filter filters the frequency domain receive signal corresponding to one of the division frames, the one of the division frames serving as a reference, in the first section to generate the first signal, and filters the frequency domain receive signal corresponding to another of the division frames in the second section to generate a plurality of second signals of the at least one second signal,
the correlation calculator calculates a cross correlation between the first signal corresponding to the one of the division frames serving as the reference and each of the plurality of second signals corresponding to the other of the division frames, and
the dispersion amount calculator calculates a wavelength dispersion amount, based on a position of another division frame of the other of the division frames including a maximum value of a peak value in a result of the cross correlation and a position at which a peak of the maximum value is obtained in a cross correlation of the other division frame.

6. The wavelength dispersion amount estimation apparatus according to claim 1,
wherein the correlation signal generator includes
a splitter configured to split the receive signal into two receive signals,
an oscillator configured to output an oscillating signal at an oscillation frequency of one half of the baud rate of the receive signal,
a first multiplier configured to multiply one of the two receive signals obtained through splitting by the splitter and the oscillating signal output by the oscillator to generate and output the first signal, and
a second multiplier configured to multiply one of the two receive signals obtained through splitting by the splitter and a complex conjugate of the oscillating signal output by the oscillator to generate and output the second signal.

7. The wavelength dispersion amount estimation apparatus according to claim 6, further comprising:
a first low pass filter provided at an output of the first multiplier; and
a second low pass filter provided at an output of the second multiplier,
wherein the first low pass filter filters, at a blocking frequency predetermined, the first signal output by the first multiplier to generate the first signal including a high frequency component of the receive signal, and
the second low pass filter filters, at the blocking frequency, the second signal output by the second multiplier to generate the second signal including a low frequency component of the receive signal.

8. The wavelength dispersion amount estimation apparatus according to claim 1, further comprising:
a baud rate estimation processor,
wherein the baud rate estimation processor includes
a correlation signal generator configured to generate two correlation signals with a frequency difference, from the receive signal,
a correlation calculator configured to calculate a cross correlation of the two correlation signals, and
a baud rate detector configured to calculate the baud rate of the receive signal, based on the frequency difference of the two correlation signals when a peak is obtained in the cross correlation,
wherein each of the baud rate estimation processor, the correlation signal generator, the correlation calculator and the baud rate detector is implemented by:
i) computer executable instructions executed by at least one processor,
ii) at least one circuity or
iii) a combination of computer executable instructions executed by at least one processor and at least one circuity.

* * * * *